United States Patent [19]

Iwai et al.

[11] Patent Number: 5,175,681

[45] Date of Patent: Dec. 29, 1992

[54] COMPUTERIZED SYSTEM FOR MANAGING PREPARATION AND PROSECUTION OF APPLICATIONS IN VARIOUS COUNTRIES FOR PROTECTION OF INDUSTRIAL PROPERTY RIGHTS

[75] Inventors: Takeyuki Iwai, Kanagawa; Shigeyuki Yoneyama, Tokyo; Tsukasa Ikegami; Reikichi Fujii, both of Kanagawa; Shigeru Miyauchi, Chiba, all of Japan

[73] Assignee: Sony Corporation, Japan

[21] Appl. No.: 945,506

[22] Filed: Dec. 23, 1986

[30] Foreign Application Priority Data

Dec. 27, 1985 [JP] Japan .................................. 60-292597
Dec. 27, 1985 [JP] Japan .................................. 60-292599

[51] Int. Cl.$^5$ ...................... G06F 15/00; G06F 15/21
[52] U.S. Cl. .................................. 364/400; 364/401; 364/419
[58] Field of Search .................. 364/400, 401, 419

[56] References Cited

U.S. PATENT DOCUMENTS 3,701,972 10/1972 Berkeley et al. ................... 364/200

OTHER PUBLICATIONS

Rutgers J. Comput. & Law (USA), vol. 2, No. 1, 1971, pp. 71-87.
IBM Systems Journal, vol. 21, No. 3, 1982, pp. 327-350, New York, US.
Autotestcon '82, Dayton, 12th-14th Oct. 1982, pp. 474-477, IEEE, New York, US.
Autotestcon '83, Fort Worth, 1st-3rd Nov. 1983, pp. 336-341, IEEE, New York, US.

*Primary Examiner*—Allen R. MacDonald
*Attorney, Agent, or Firm*—Ronald P. Kananen

[57] ABSTRACT

A computerized system for managing preparation and prosecution of applications for protection of industrial property rights in various contries includes a data memory which stores a rule data for controlling input, output and internal operation of the system. The rule data includes information concerning required actions at each step of prosecution of applications in each country when the applications are filed. Such rule data is so designed as to provide proper guidance to the operator for guiding proper entry of input data in order to avoid error in operation. Preferably, the rule data consists of common rule data components which are commonly applicable for applications in any country and local rule data components which are specifically applicable for a specific country.

76 Claims, 18 Drawing Sheets

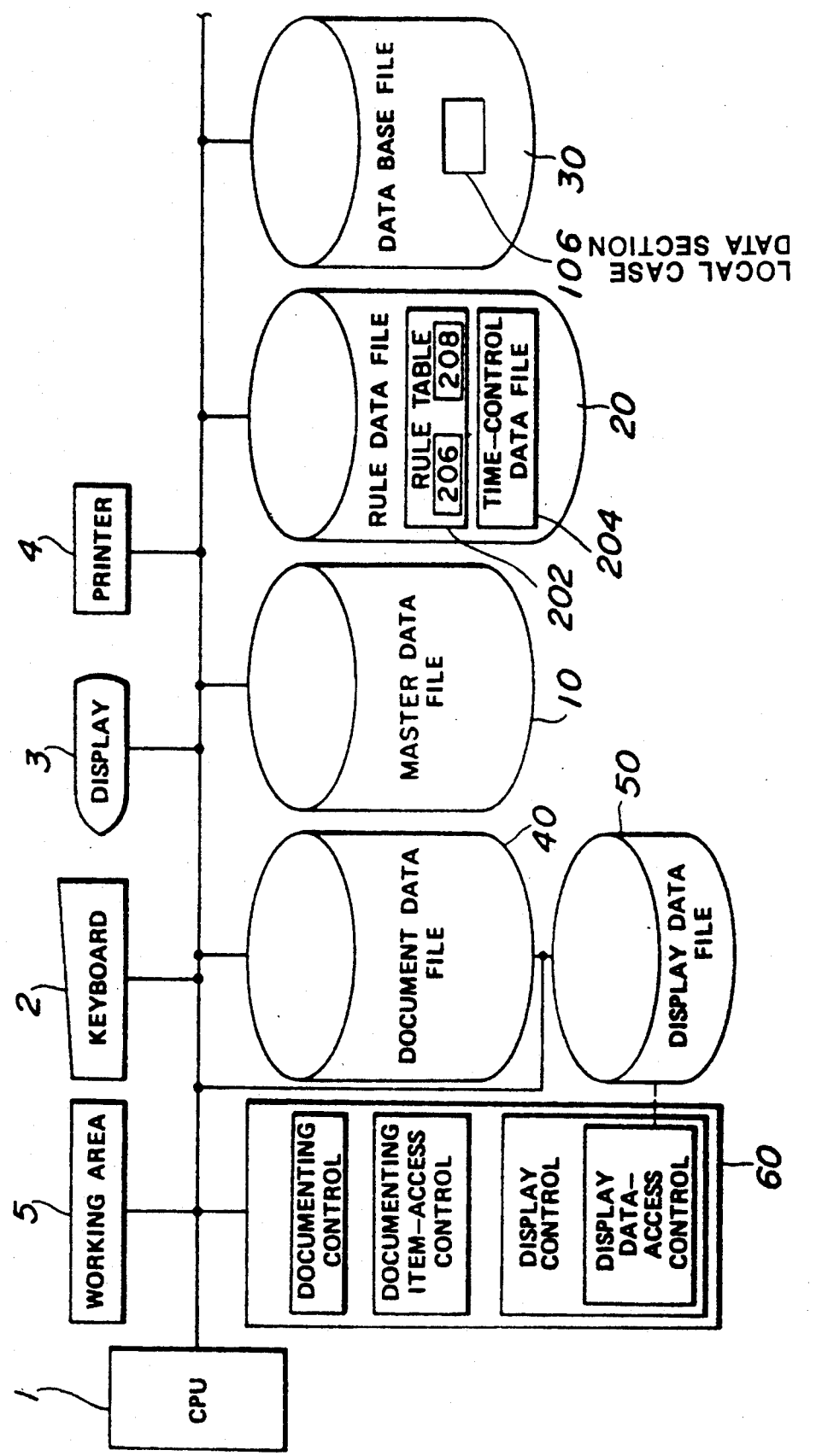

FIG.2

| COMMON STEP NO. | COMMON STEP NAME |
| | ABBREVIATED STEP NAME |
| | COMMON DISPLAY NAME |
| COMMON STEP NO. | COMMON STEP NAME |
| | ABBREVIATED STEP NAME |
| | COMMON DISPLAY NAME |
| COMMON STEP NO. | COMMON STEP NAME |
| | ABBREVIATED STEP NAME |

FIG.3

| STATE CODE | ROUTE CODE | | | |
|---|---|---|---|---|
| STEP NO. | | | | |
| LEGAL TERM | REFERENCE DATE CODE | | | |
| STEP NAME | | | | |
| ABBREVIATED STATE NAME | | | | |
| DISPLAY NAME | | | | |
| START CODE | INDEPENDENT FLG. | STEP RANGE | STEP REPEAT FLG. | NEXT STEP FLG. |
| NEXT STEP NO. | | | | |
| NEXT STEP NO. | | | | |
| STEP NO. | | | | |
| LEGAL TERM | | | | |

FIG. 7

| STEP NO. | COMMON STEP NAME / ABBREVIATED NAME / COMMON DISPLAY NAME |
|---|---|
| A 0 1 | FIRST APPLICATION / FIRST APPLICATION / PREPARATION OF APPLICATION |
| 0 0 1 | FILING/FILING RECEIPT / FILING/RECEIPT / FILING/FILING RECEIPT |
| 0 0 2 | FILING/FILING RECEIPT (WITH PRE.-EXAM.) / FILING/RECEIPT (PRE-EXAM.) / FILING/FILING RECEIPT (WITH PRE.-EXAM.) |
| 0 0 3 | REQUEST PRELIMINARY EXAMINATION / PRE.-EXAMINATION / REQUEST PRELIMINARY EXAMINATION |

FIG. 8

STATE: U S  U.S.A.  KIND: NATIONAL

| INC. STP | STEPS | STEP NO | STEP NAME |
|---|---|---|---|
| 0 0 | 0 0 | A 0 1 | FIRST APPLICATION |
| 0 0 | 0 1 | 0 0 1 | FILING/FILING RECEIPT |
| 0 0 | 0 0 | 0 0 2 | FILING/FILING RECEIPT (PRE-EXAM.) |
| 0 0 | 0 0 | 0 0 3 | REQUEST PRELIMINARY EXAMINATION |
| 0 0 | 0 0 | 0 0 4 | RECEIPT SEARCH REPORT |
| 0 0 | 0 0 | 0 0 6 | FIRST PUBLICATION |
| 0 0 | 0 0 | 0 0 7 | RECEIPT ORDER FOR EXAM. (AU) |
| 0 0 | 0 0 | 0 0 8 | REQUEST SUBSTANTIVE EXAMINATION |
| 0 0 | 0 0 | 0 1 0 | REQUIREMENT INFORMATION DISCLOSURE (CA) |
| 0 0 | 0 0 | 0 1 1 | RESPONSE INFORMATION DISCLOSURE (CA) |
| 0 0 | 0 0 | 0 2 0 | AMENDMENT (PCT ART. 19) |
| 0 0 | 0 0 | 0 2 1 | FILING TRANSLATION (PCT) |
| 0 0 | 0 0 | 1 0 1 | OFFICE ACTION (MERIT) |
| 0 0 | 0 0 | 1 0 2 | RESPONSE TO OFFICE ACTION (MERIT) |
| 0 0 | 0 0 | 1 0 3 | DECISION OF REJECTION |
| 0 0 | 0 1 | 2 0 1 | OFFICE ACTION (MERIT) (US/CA) |
| 0 0 | 0 1 | 2 0 2 | RESPONSE (MERIT) (US/CA) |
| 0 0 | 0 1 | 2 0 3 | FINAL OFFICE ACTION (US/CA) |
| 0 0 | 0 1 | 2 0 4 | AMENDMENT (RULE 116) |

FIG. 12

```
* * * DUE DATE SET * * *
                                              DATE 85/10/18
STATE:  U. S.  U. S. A. ROUTE: NATIONAL   LAST UPDATING DATE 85/07/26
  NEW  STEP NO.      DATE CODE              STEP NO.    DATE CODE
340─┤  201  │      │  201  │─341      342─┤ 20101 │    │  202  │
  → STATE CODE,   *1: FIRST PARENT   *2: DIRECT PARENT  3: SELF  343

YEAR    MONTH    DATE    OCCURENCE
                                                         ─344   346
              DUE DATE           │ 00 │  │ 03 │  │ 000 │
              EXTENSION          │ 00 │  │ 01 │  │ 000 │  │ 03 │
                                                  │
                                                 345
```

FIG. 13

```
U S FILE (0)
    1: HEADER SET FILE
    2: TERM SET FILE
    3: NUMBER SET FILE
    4: PERIOD SET FILE
          .
          .
          .
U S FILE (2)
          .
          .
          .
          .
```

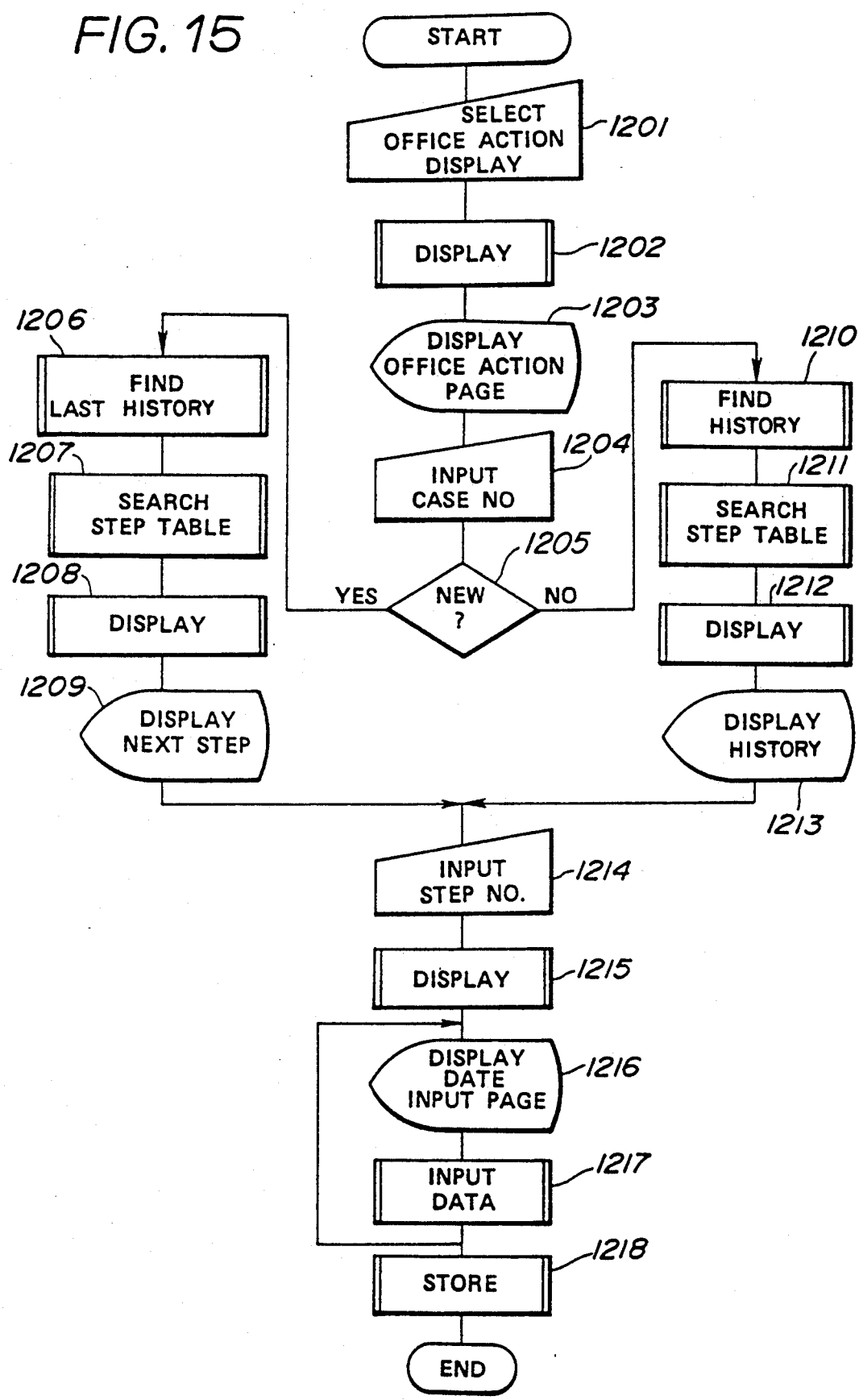

FIG. 16

| UNIT REF. NO. | STATE CODE | ROUTE CODE | |
|---|---|---|---|
| FILING PARTICULARS | | | |
| STEP NO. | SELECT DATE | DATA NO. | DATE |
| 00101 | 840104 | 001 | 840102 |

360 – UNIT REF. NO.
361 – STATE CODE
362 – FILING PARTICULARS
363 – STEP NO.
364 – SELECT DATE
365 – DATA NO.
366 – DATE
367

FIG. 17

REF. NO. [S84P100US00]  KIND [1]   (1: NEW  2: MODIFY)   STEP NO.
STEP NO.    STEP NAME           STEP NO.    STEP NAME 370, 371

FIG. 18

REF. NO. [S84P100US00] KIND [1]  (1: NEW  2: MODIFY)  STEP NO. [20101]
STEP NO.   STEP NAME              STEP NO.   STEP NAME
 20101  OFFICE ACTION (MERIT)    20601  DECLARATION INTERFERENCE
 51001  NOTICE OF ALLOWANCE      20801  FILING DISCLAIMER
                                 70101  RELEVANT MATERIAL
                                 70201  INFORMATION DISCLOSURE
                                 70301  INFORMATION DISCLOSURE (BY THIRD)
                                 80101  VOLUNTARY AMENDMENT
                                 82001  KEYWORD
                                 83001  REF. NO. OF RELATED APPLN.
                                 84001  MODEL (WORKING)
                                 90101  FINAL RESULT 370, 371, 372, 373

FIG. 19

REF. NO. [S84P100US00]   KIND [2]   (1:NEW  2:MODIFY)   STEP NO. [00101]
STEP NO.      STEP NAME                STEP NO.    STEP NAME
 00101    FILING/FILING RECEIPT

```
MODIFY   OFFICE ACTION/FINAL OFFICE ACTION (U. S. A.) DATE 85/10/18
REF. NO.  S84P100US00  TITLE: INFORMATION CONVERSION SYSTEM
MAN IN CHARGE
```

| | PTO MAIL DATE | AGENT MAIL DATE | RECEIPT DATE | AGENT TERM | ER | EX | DUE DATE | INST. DATE | FILE DATE |
|---|---|---|---|---|---|---|---|---|---|
| 1ST | 850925 | 851001 | 851009 | 851225 | ☐ | ☐ | ☐ | ☐ | ☐ |
| | FILING | RESPONSE | (AMENDMENT | REMARKS) | | | | | |
| 2ND | ☐ | ☐ | ☐ | ☐ | ☐ | ☐ | ☐ | ☐ | ☐ |
| 3RD | ☐ | ☐ | ☐ | ☐ | ☐ | ☐ | ☐ | ☐ | ☐ |
| 4TH | ☐ | ☐ | ☐ | ☐ | ☐ | ☐ | ☐ | ☐ | ☐ |

FINAL OFFICE ACTION
FILING RULE 116 AMENDMENT
*INTERFERENCE (CONFLICT)
  OCCURENCE (1) ☐       (2) ☐

*TERMINAL DISCLAIMER    RELEVANT REF. NO. ☐
            INST. DATE ☐     FILE DATE ☐

*DISCLAIMER    INST. DATE ☐     FILE DATE ☐

LETTER OUT    Y / N ☐    REFERENCE INPUT   Y / N ☐

FIG.22

```
MODIFY   OFFICE ACTION/FINAL OFFICE ACTION (U. S. A.) DATE 85/10/18
REF. NO. S84P100US00  TITLE: INFORMATION CONVERSION SYSTEM
MAN IN CHARGE
```

|     | PTO MAIL DATE | AGENT MAIL DATE | RECEIPT DATE | AGENT TERM | ER | EX | DUE DATE | INST. DATE | FILE DATE |
|-----|---------------|-----------------|--------------|------------|-----|----|----------|-----------|-----------|
| 1ST | 850925 | 851001 | 851009 | 851225 | 3 | Y | 851225 | | |
|     | FILING | RESPONSE | (AMENDMENT | REMARKS) | | | | | |
| 2ND | | | | | | | | | |
| 3RD | | | | | | | | | |
| 4TH | | | | | | | | | |

FINAL OFFICE ACTION

FILING RULE 116 AMENDMENT

*INTERFERENCE (CONFLICT)
    OCCURENCE (1) [    ]    (2) [    ]
*TERMINAL DISCLAIMER    RELEVANT REF. NO. [    ]
                INST. DATE [    ]    FILE DATE [    ]
*DISCLAIMER    INST. DATE [    ]    FILE DATE [    ]
LETTER OUT    Y / N [ ]    REFERENCE INPUT    Y / N [ ]

FIG.24

```
B300              * * * LETTER OUTPUT MENU * * *           DATE  12/12/85

STEP CODE    [12]      REF. NO.[S84P100US00]

PREPARATION STEP
  0 1      REQUEST FOR FORMAL PAPER
  0 2      INFORMATION LIST
  0 3      REQUEST FOR CERTIFIED COPY
  0 4      REQUEST FOR TRANSLATION AND DRAWINGS
  0 5      REQUEST FOR CHECKING OF ENGLISH DRAFT

APPLICATION FILING STEP
  0 6      INSTRUCTION FOR FILING APPLICATION
  0 7      INSTRUCTION FOR FILING APPLICATION AS FIRST APPLICATION
  0 8      INSTRUCTION FOR FILING APPLICATION DERIVED FROM PARENT

INTERMEDIATE ACTION
  0 9      REQUEST FOR EXAMINATION
  1 0      INSTRUCTION FOR ART. 19 AMENDMENT (PCT)
  1 1      INSTRUCTION FOR TRANSLATION (PCT)
  1 2      INSTRUCTION FOR RESPONSE TO OFFICE ACTION/OPPOSITION
  1 3      INSTRUCTION FOR RESPONSE TO RULE 40 ACTION (CA)
  1 4      INSTRUCTION FOR OFFICE ACTION (TW)
  1 5      INSTRUCTION FOR TRANSLATION (EPC)

OTHERS
  1 6      INSTRUCTION FOR INFORMATION DISCLOSURE STATEMENT
  1 7      INSTRUCTION FOR PRELIMINARY/VOLUNTARY AMENDMENT
  1 8      INSTRUCTION FOR LATE FILING
  1 9      COVER-LETTER FOR REMITTANCE

INTERNAL DOCUMENTS
  2 0      NOTICE OF FOREIGN PATENT APPLICATIONS
           REQUEST FOR EXECUTION FOR FORMAL PAPERS
  2 1      NOTICE FOR ISSUE OF PATENT
  2 2      NOTICE FOR ABANDONMENT OF PATENT
  2 3      FILE LABEL 9 9      EXIT
```

FIG. 25

```
* * * INSTRUCTION FOR RESPONSE TO OFFICE ACTION/OPPOSITION * * *
                                                    DATE YY/MM/DD
REF. NO. [S84P100US00]  TITLE: [INFORMATION CONVERSION SYSTEM]
MAN IN CHARGE [   K   ]   AGENT [ A LAW FIRM ]
    [Y]     WE ACKNOWLEDGE RECEIPT OF YOUR LETTER OF [851001] ENCLOSING THE
            FOLLOWING DOCUMENT(S).
        [Y] OFFICE ACTION
        [ ] THE GROUND OF OPPOSITION
        [ ] THE REFUTATION OF OPPOSITION

[Y]     ENCLOSED ARE OUR COMMENTS ON THE ABOVE ACTION [850925]

[ ]     WE WILL FURTHER CONSIDER THE ACTION AND SEND OUR COMMENT SOON.
            FURTHER TO OUR [ ] TELECOPY DATED [      ] . WE ARE ENCLOSING
                           [ ] TELEX DATED
                           [ ] LETTER DATED
            HEREWITH COMMENTS.
    [ ]     PLEASE TAKE NO FURTHER STEP IN PROSECUTING THE SUBJECT
            APPLICATION AT THIS TIME.
    [ ]     WE HAVE NO COMMENT TO CONTRIBUTE AND REQUEST YOU TO PREPARE A
            SUITABLE RESPONSE.

INITIAL OF MAN IN CHARGE [        ]
```

FIG.26

```
423   DECEMBER 13,1985
      MR. A
424   A LAW FIRM
        1828 L STREET NORTHWEST
425   WASHINGTON, D.C. 20036-5104
      U. S. A.
                                              426
   Re: Patent Application No. in  United States  06/123,456
       Your Ref:   012345
       Our  Ref:   S84P100US00      427

Dear Mr.    A
   We acknowledge receipt of your letter of
   October 1, 1985 enclosing the following document(s).
   420         the Office Action   421

Enclosed are our comments on the above action.

Please prepare a suitable response and file it in your Patent Office
   before the due date  December 1, 1985   422

We appreciate your cooperation in this matter.
   Very truly yours,

Mr. B, General Manager,
   Patent Div.
   NN NN NN.
   Enc
```

COMPUTERIZED SYSTEM FOR MANAGING PREPARATION AND PROSECUTION OF APPLICATIONS IN VARIOUS COUNTRIES FOR PROTECTION OF INDUSTRIAL PROPERTY RIGHTS

BACKGROUND OF THE INVENTION

1. Field of the Invention

The present invention relates generally to a computerized system for managing the preparation and prosecution of applications for the protection of industrial property rights, such as patents, in various countries. More specifically, the invention relates to a computer system useful for docketing new applications to be filed in various countries having mutually different laws and rules for giving protection for the industrial property rights, for controlling the preparation of application documents and the procedure for filing the applications, for docketing intermediate actions from the patent offices of various countries, for controlling terms including reminders to persons in charge of specific applications of the due date and so forth, and for issuing instructions to persons in various countries for taking required actions.

2. Description of the Background Art

As is well known, different countries require procedures in granting patents, registrations of utility models, designs and trademarks and so forth. This prevents simplification of the preparation and prosecution of applications filed in various countries. For instance, in preparing the application, different countries require different minimum documents for obtaining a filing date, for obtaining benefits of priority rights and so forth. Also, the different countries have different time periods for prosecuting the applications. In cases where an applicant uses foreign persons for prosecuting applications in various countries, each set of instructions to be issued by the applicant has to be timely and adapted to the practice of the subjective country. This requires substantial attention by the person in charge of the application. This requires the applicant to hire qualified persons for managing the applications to be filed and prosecuted in the various countries. This increases the cost of filing the applications in various countries and serves as a discouraging factor for the applicant to file foreign applications.

In order to manage such complicated procedures in various countries, there have been proposed and developed various computerized managing systems in the recent years. Such prior proposed systems are designed to manage applications in one country in a managing system which is independent of that for managing applications in other countries. This makes the overall system unacceptably expensive. Furthermore, prior proposed managing systems are governed by software programs containing rules for prosecuting and controlling applications of individual country as a part of the program. This requires modification of the entire program every time there is a revision of the laws in the associated country or a revision of internal procedures.

SUMMARY OF THE INVENTION

Therefore, it is an object of the present invention to provide a computerized system which is designed to resolve the problems in the prior proposed systems and is less expensive than prior systems.

Another object of the invention is to provide a computerized system suitable for managing applications for protection of industrial property rights in various countries, which allows management of preparation and prosecution of applications with a simplified procedure.

A further object of the invention is to provide a computerized managing system for industrial property applications in various countries in which it is easy to modify the procedure when necessary for adapting the system to a revision of the laws in the concerned countries and to a modification of the internal procedures of the concerned countries for the applicant.

A still further object of the present invention is to provide a computerized system for managing prosecution of industrial property applications, which can issue instruction letters for foreign persons representing the applications before the patent offices in the countries concerned, in a form suitable for accurately and definitely providing instructions for the foreign persons.

A yet further object of the present invention is to provide a computerized system for managing the prosecution of industrial property applications, which does not require skill in operating and controlling the prosecution of applications.

In order to accomplish the aforementioned and other objects, a computerized system for managing the preparation and prosecution of applications for the protection of industrial property rights in various countries according to the present invention, includes a data memory which stores rules data for controlling the input, output and internal operation of the system. The rules data include information concerning required actions at each step of the prosecution of the applications in each country where the applications are filed. Such rules data are so designed as to provide proper guidance to the operator for guiding proper entry of input data in order to avoid error in operation.

In the preferred embodiment, the rules data consist of common rule data components which are commonly applicable for applications in any country and local rule data components which are specifically applicable for a specific country.

In the proposed system, the rule data are removed from the computer program so that updating of the rule data when the necessity occurs can be performed easily without having to modify the entire program.

According to one aspect of the invention, a system for managing the preparation and prosecution of applications to be filed in various countries for the protection of industrial property rights, comprises first memory means for storing information concerning each application, including the identification of the application and identification of the country in which to file the application, second memory means for storing the rules for controlling the processing of the application throughout preparation and prosecution of the application, the rules being established with respect to each country to file applications for defining an order of steps to be taken during the preparation and prosecution of the application and for establishing a time table for due dates for taking action with respect to the corresponding country and is accessible by identifying the country to which the application is filed, third means for displaying necessary information and guidance for processing the application including entry of data according to the rules stored in the second memory means, and fourth means for allowing entry of data and allowing command for operating the managing system and controlling the updating of contents in the first and/or second memory means.

Preferably, the first memory means further comprises a local case data file having a plurality of file pages each storing case data of each corresponding application, the case data including data indicative of the history of the application and indicative of the current status of the application.

The second memory may store the rules including a rule for selecting one or more necessarily occuring next steps with respect to current status of the application. The rules in the second memory means comprises a rule table set with respect to each country to file the application and is accessible by identifying the country, and the rule table can be updated through the fourth means.

The system further comprises fifth memory means for storing a plurality of display formats to be displayed on the third means, and the second means storing the rules including a rule table for selecting one display format according to the step to enter data.

In the preferred construction, the second memory means stores data with respect to each of a plurality of steps in each rule table, each of the steps in the rule table are identified by a step number given thereto. The second memory means further comprises a common step table containing all of the necessary steps for preparation and prosecution of applications in all the countries desired to file the applications in. Each step in the common step table is given a step number for identifying the step. The rule table for each country is established by selecting the steps in the common step table in order according to normal procedure to be taken in preparing and prosecuting the application in the desired country. The steps in the common step table and the rule table are accessible through the fourth means by entering step numbers given to respective steps for identification thereof. The step number given for each step in the rule table has a first component common to the step number of each corresponding step in the common step table and a second component independent of the step number of the corresponding step in the common step table for distinguishing the step in the rule table from the corresponding step in the common step table. The rule table in the second memory means further contains term calculation data for calculating and deriving due date with respect to a reference date in each step, the term calculation data being accessible by identifying the step by entry of the step number through the fourth means.

Further, preferably, the rule table contains data indicative of an effective period of each step therein in view of the laws and/or rules in the subject country which effective period is defined by the starting date data and ending date data of the effective period. The effective period set in the rule table with respect to each step in the rule table is set in terms of a reference date, and the effective period data being associated with a identification of the reference date. The fourth means compares an input date corresponding to the reference date with the starting date data and ending date data in response to entry of the step number for checking whether the updating of the step date for the step identified by the entered step number is valid or not, so that the step data can be updated only by the valid data.

The system further comprises fifth memory means for storing a plurality of display formats to be displayed on the third means, and the second means storing the rules including a rule for selecting one display format according to the step to enter data. Each display format is accessible by identifying a step in the rule table by entering the step number. In addition, the system further comprises sixth memory means for storing a plurality of printer document data which are accessible by identifying the step for preparing letters. The printer document data stored in the sixth memory means comprises a first component containing fixed letter format to be commonly used in various steps and for various applications in various countries, and a second component adapted to accept specific variables with respect to subject step and subject application. The second component stored in the sixth memory means is a letter format taking a specific variable as a part of the letter. The fourth means picks up variables from the corresponding file page of the local case data file in the first means for automatically completing the letter in the second component. The fourth means further picks the variables to constitute part of the letter in the second component. The fourth means further picks the variables to constitute part of the letter of the second component from the information stored in the first memory means.

According to another aspect of the invention, a system for managing the preparation and prosecution of applications to be filed in various countries for protection of industrial property rights comprises: first memory means for storing information concerning each application, the first memory means comprising a database file including identification of each application, identification of country to file the application, filing particulars and so forth, second memory means for storing a rule table for controlling the processing of each application throughout preparation and prosecution of the application and a time table for controlling calculation of the term, the rule table being established with respect to each country to file the application for defining an order of steps to be taken during preparation and prosecution of the application. The steps in the rule table being identified by given step numbers for establishing a time table for determining due dates for taking action with respect to the corresponding country and is accessible by identifying the country and step number of the corresponding step set in the rule table in the processing of the application, third means for establishing a case data file containing a plurality of file pages, each of which is adapted to store file data with respect to the subject application, the store file data including a history data showing the history of the preparation and prosecution and the current status of the subject application. Each file page of the case file further includes data showing due dates for taking necessary action based on entered data according to the time table, and fourth means for allowing entry of data and command for operating the managing system and controlling the updating of contents in the first and/or second memory means.

According to a further aspect of the invention, a system for managing the preparation and prosecution of applications to be filed in various countries for the protection of industrial property rights comprises: first memory means for storing information concerning each application, the first memory means comprising a database file including identification of each application, identification of each country to file the application, filing particulars and so forth, second memory means for storing a rule table for controlling the processing of applications throughout preparation and prosecution of the application and a time table for controlling calculation of the term. The rule table being applicable with respect to each country to file the application for defining an order of steps to be taken during the preparation and prosecution of the application. The steps in the rule table being identified by given step numbers and establish a time table for determining the due dates for taking action with respect to the corresponding country and are accessible by identifying the country and step number of corresponding step set in the rule table for processing the process application, third memory means for establishing a case data file containing a plurality of file pages, each of which is adapted to store file data with respect to a subject application. The store of file data includes history data showing the history of the preparation and the prosecution and the current status of the subject application. Each file page of the case file further includes data showing the due date for taking necessary action based on entered data according to the time table, fourth memory means for storing a plurality of display formats, each of which corresponds to one of the steps set in the rule table and is accessible by identifying the subject step by setting the step number and each of the display formats including guidances for requiring entry of data, a display, and fifth means for allowing entry of data and command for operating the managing system, reading out one of the display formats according to set step number for displaying a selected one of the display formats on the display, and controlling the updating of contents displayed in the display format.

In the preferred construction, the fourth memory means includes a first group of display formats accessible through the fifth means for updating the rule table, a second group of display formats accessible through the fifth means for updating the time table and a third group of display formats accessible through the fifth means for updating the case data file. The step number to be given for each step in the rule table has a first component common to the step number of each corresponding step in the common step table and a second component independent of the step number of the corresponding step in the common step table for distinguishing the steps in the rule table from the corresponding step in the common step table. The fourth memory means further includes a display format to be utilized for establishing the rule table by selecting steps in the common step table. The fourth memory means further includes a display format to be utilized for establishing the time table.

According to a still further aspect of the invention, there is provided a system for managing the preparation and prosecution of applications to be filed in various countries for the protection of industrial property which comprises: first memory means for storing information concerning each application, the first memory means comprising a database file including identification of each application, an identification of each country to file in the application in, filing particulars and so forth, second memory means for storing a rule table for controlling processing of applications throughout preparation and prosecution of the applications and a time table for controlling calculations of the term. The rule table is established with respect to each country to file the applications in for defining an order of steps to be taken during preparation and prosecution of the applications. The steps in the rule table are identified by given step numbers and for establishing a time table for determining the due dates for taking action with respect to corresponding countries and are accessible by identifying the country and step number of the corresponding step set in the rule table in the processing of the applications, third memory means for establishing case data file containing a plurality of file pages, each of which is adapted to store file data with respect to specific applications. The stored file data includes history data showing the history of the preparation and prosecution and current status of the applications. Each file page of the case file further includes data showing the date for taking necessary action based on data according to the time table, fourth memory means is provided for storing a plurality of printer document formats, each of which corresponds to one of the steps set in the rule table and is accessible by identifying the subject step by setting the step number for a printer document format, fifth means is provided for allowing entry of data and for allowing commands for operating the managing system, reading out of one of the printer document formats according to the set step number for displaying selected ones of the printer document formats for preparing letters, and controlling updating of contents in the first, second, third and fourth memory means.

According to a still further aspect of the invention, a computerized system is provided for managing and controlling works, each containing a plurality of steps. The system comprises first memory means for storing first data for performing operations in each step. The first memory means contains the stored first data with respect to all possible steps for performing the works. Included is second memory means for storing second data for performing an operation of steps to perform each work. The second data is established by selecting and picking up the first data from the first memory means according to possible steps to be taken for performing subjective work. The second data includes next step data for identifying one or more possible next steps for guiding operations, and the second data is accessible for identifying subjective work to be done. Third means is provided for allowing manual access of the first and/or second means for updating the first and/or second data. Fourth means is provided for managing and/or controlling operation each step in each work to the second data in the second memory means.

The second memory means includes a first memory section for storing the second data, and a second memory section for storing the second data, and a second memory section for storing tables for setting terms for completing the associated steps. All of the term setting rule tables are stored in the first memory means and picked up through the third means for establishing the second memory section.

The system further comprises local work memory means for storing data with respect to each specific work and to be updated according to the second data. Each of the specific work data stored in the local work memory means is accessible by identifying the work by means of a unique work code signal to each specific work. Each term setting table is accessible by identifying the associated step.

According to a yet further aspect of the invention, there is provided a system for managing the preparation and prosecution of applications for the protection of industrial property rights, the system comprises first memory means for storing information concerning each application, including identification of the application. Included in the system is a second memory means for storing rules for controlling the processing of applications through the preparation and prosecution of the applications. The rules define an order of steps to be taken during the preparation and prosecution of the applications and the establishing of a time table for due dates for taking action. The rules include identification of the next steps which possibly could occur. Included in the system is third means for displaying necessary information and guidance for processing the applications including entry of data according to the rules stored in the second means. Included in the system is fourth means for allowing entry of data and commands for operating the managing system and for controlling the updating of contents in the first and/or second memory means.

BRIEF DESCRIPTION OF THE DRAWINGS

The present invention will be understood more fully from the detailed description given herebelow and from the accompanying drawings of the preferred embodiment of the invention, which, however, should not be taken to limit the invention, to the specific embodiment but are for explanation and understanding only.

In the drawings:

FIG. 1 is a block diagram of the preferred embodiment of a computerized system for managing preparation and prosecution of applications for protection of industrial property rights, according to the invention;

FIG. 2 is an explanatory illustration showing data structure of a common step table set in a rule data file memory in the system of FIG. 1;

FIG. 3 is an explanatory illustration showing a data structure of a step set table in the rule data memory for setting steps to be taken with respect to each country to file an application;

FIG. 7 is an illustration showing an example of a format of display for entry of data of common steps, which is displayed on the display;

FIG. 8 is an illustration showing an example of a format of display for the entry of step selection data with respect to each designated country

FIG. 12 is an illustration showing an example of a display format for setting of a due date calculation table;

FIG. 13 is an explanatory illustration showing an example of data structure showing the menu of a due date set:

FIG. 15 is a flowchart of a next step processing program to be executed in the system of FIG. 1;

FIG. 16 is an explanatory illustration showing a format of a unit case file memory in the system of FIG. 1;

FIGS. 17, 18 and 19 are explanatory illustrations showing a format of an intermediate action processing menu to be displayed on the display;

FIG. 20 is an illustration showing examples of an entry of time date for the intermediate action processing format;

FIG. 22 is an illustration showing examples of entry of time data for the intermediate action processing format;

FIG. 24 is an illustration of a display format of a print menu; and

FIGS. 25 and 26 are illustrations showing display formats for issuing instruction letters for agents.

DESCRIPTION OF THE PREFERRED EMBODIMENT

Figure 4:
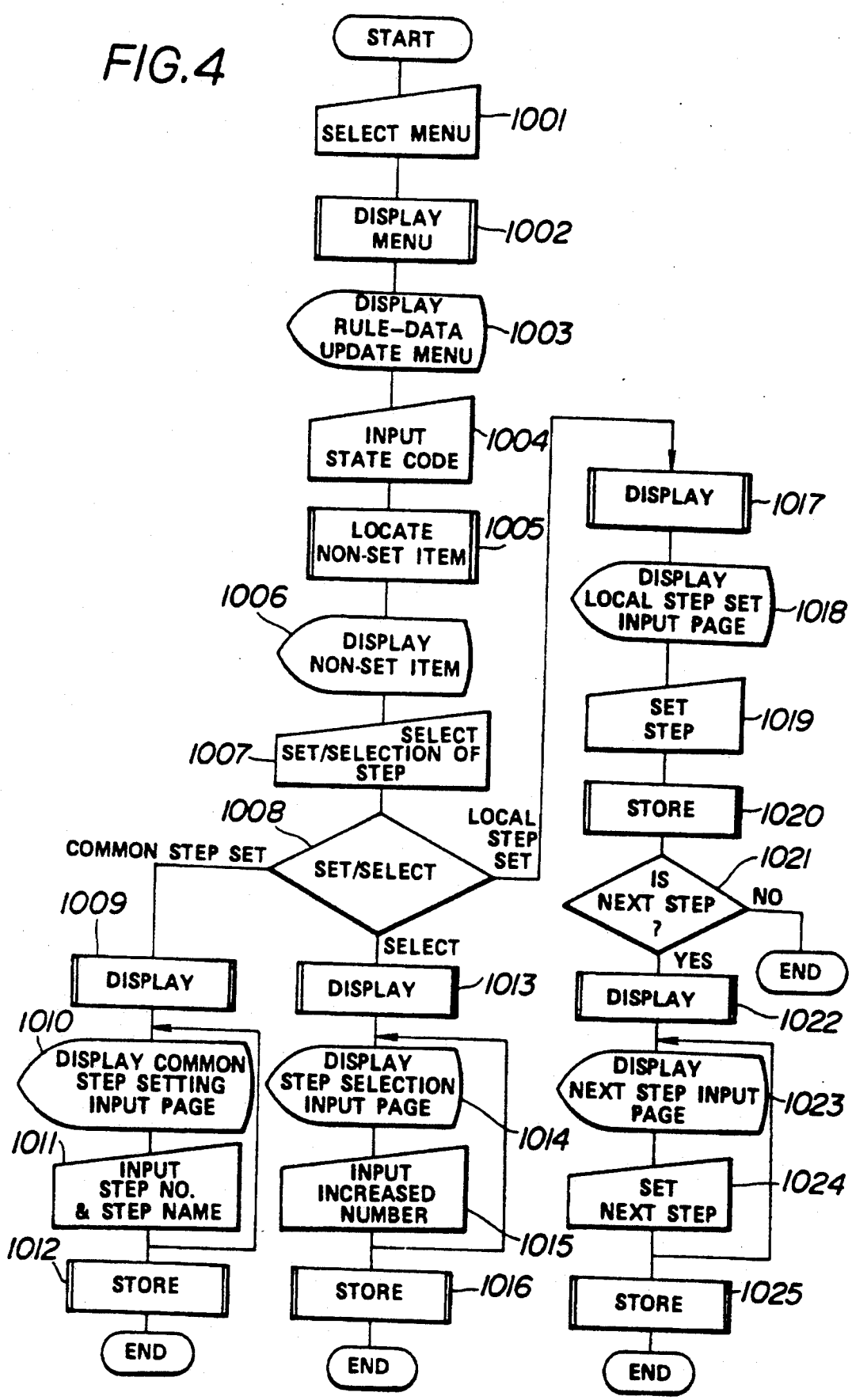
FIG. 4 is a flowchart of a program for setting steps with respect to each country.

Referring now to the drawings, particularly to FIG. 1, the preferred embodiment of a system for managing the preparation and prosecution of applications for the protection of industrial property rights in various countries, according to the present invention, comprises a computer including a central processing unit (CPU) 1. CPU 1 is associated with various memories, each of which constitutes a data file, and a peripheral equipment, such as a keyboard 2, a display unit 3, a printer 4 and so forth. The system also has a working area 5 for temporarily registering input data, intermediate data and so forth. In the shown embodiment, the memories constitute a master file 10, a rule data file 20, a case file 30, a document format data file or document data file 40, a display format data or display data file 50 and a control data file 60.

The master file 10 is divided into a plurality of unit memory blocks for storing basic data, such as agents, names and agents' addresses accessible by agents code given to each agent, name of internal staff in charge of applications accessible by identifying staff code, country names accessible by abbreviated country code and so forth. The case file 30 includes a plurality of memory blocks of a desired memory capacity. Each unit memory block constitutes a storage for storing basic or fundamental data of an individual application, such as identification of the application, i.e. data of the basic application based on which a priority right under the Paris Convention is to be claimed, title of the invention, names of inventors, and so forth. The unit memory block of the case file 30 is further designed to store agent's docket number, application numbers, filing date, first (unexamined) publication number, first publication date, second (examined) publication number, second publication date, patent number, issue date and so forth. As is well known, the applications in the different countries derived from a single invention will be hereafter referred to as "family applications". Similarly, patents issued for the same invention in different countries will be hereafter referred to as "family patents". Each of the other sections in the case file are designed to store particular data for each designated country.

If necessary of desired, the case file may store a brief summary of the invention and a typical drawing of the subject matter of the invention. In this case, the brief summary may be prepared specially for an index search for locating related applications utilizing keywords. On the other hand, a local case data section 106 may include data of material references uncovered during prosecution of the subject application. Such data of references with respect to each application will be helpful for disclosing material references to a U.S. examiner, Canadian examiner, Chinese examiner and so forth for satisfying an applicant's duty of disclosure given in the laws or rules. Each case page may be expandable of the size by increasing the local case data section for allowing entry of local data with respect to later derived applications, such as continuation and/or continuation-in-part (CIP) applications filed in the United States, divisional applications, confirmation patents based on issued U.S. or British patents and so forth. Such continuation applications, CIP applications, divisional applications, and confirmation patents will be hereafter referred to as a "later derived application or applications".

Though the specific structure of data in the case file 30 has been disclosed hereabove, any data structure can be taken for forming the case file. For example, although the foregoing specific embodiments separate the date to be stored in the case file into a common data component and a local data component, it would be possible to establish the case page with respect to each application in each country. In this case, the common data component should be included in each case page. Furthermore, in such case, each case page may include data identifying family applications so that the family application may be easily accessed.

The rule date file 20 is generally designed for storing rules for operating the preferred embodiment of the system. The rule data file 20 has two separate sections. One of the sections stores a step-control rule table which will be hereafter referred to as "rule table 202". The other section stores a table for setting and controlling times, such as priority deadlines, due data for responding to office actions and to paying issue fees, printing fees, patenting fees, maintenance taxes and so forth. This later table may be hereafter referred to as "time-control table 204".

FIG. 2 generally shows structure of a section 206 of rule table 202 for storing common step data. This section 206 will be hereafter referred to as "common step rule section 206". The common step rule section 206 of the rule table 202 is separated into a plurality of unit blocks 210 for storing data of each individual common step. Each of these blocks will be hereafter referred to as "common step block 210". Each common step block 210 has a data area 2101 for storing common step number, a data area 2102 for storing a common name given to the corresponding common step, a data area 2103 for storing an abbreviated step name which is derived from the given common step name, and a data area 2104 for storing a display format name (display name) given for a display format which is stored in the display data file 50, and will be discussed later, corresponding to the common step. The common step rule section 206 includes a common step blocks 210 covering all possible process steps possibly occuring during the preparation and prosecution of applications in various countries. For instance, the common step rule section 206 contains the common step section 210 for storing step data of the filing of the first application, filing other applications, receiving official filing receipts, first publications, requesting examinations, receiving search reports, receiving office actions, filing responses to the office actions, filing amendments, receiving final office actions or decisions of rejections, filing appeals, second publications, receiving oppositions, receiving notices of allowance, grants or acceptances, issues of patents and so forth. Such common step blocks 210 are given numbers such as "A01", "001" or so forth, in a predetermined order. This number serves as the common step number. Therefore, such numbers are stored in the data area 2101 of respective common step blocks 210.

The common step name is given to each of the steps set in each corresponding common step blocks 210 so as to identify the corresponding step. FIG. 7 shows an example of a display format to be displayed on the display unit 3 for entry of the common step data in the common step rule section 206. As will be seen from FIG. 7, in the shown embodiment, step data of the preparation and filing of the first application in the first filing country is set under the common step number "A01". In the date structure of the common step block numbered "A01", the common step name is given as "FIRST APPLICATION". Since the given name is simple and short enough the same name, i.e. "FIRST APPLICATION", is used as an abbreviated step name set in the data area 2103. The corresponding display format is names as "PREPARATION OF APPLICATION". Similarly, the filing of an application and receiving of an official filing receipt is set under the common step number "001". For this step, common step name is given as "FILING/FILING RECEIPT". The step name as set in the data area 2102 is abbreviated as "FILING/RECEIPT" and is set in the data area 2103. The corresponding display format name is given as "FILING/FILING RECEIPT" and set in the data area 2104. In the same manner, various process steps in preparation and prosecution of the application is set in the common step rule table 206.

The common step rule table 206 as set forth above can be updated when necessity occurs by accessing the rule data file 20 through the keyboard 2. When the rule data file 20 is accessed for updating the common step rule table, the display unit 3 displays the display format of FIG. 7 so as to allow modification of the already set step data, the addition of an additional step or deletion of already set step. This makes it easy to adapt the system operation when revision of laws and/or rules occur in some country or necessity occurs to modify the procedure in the application. The detailed procedure for updating the common step rule table 206 will be discussed later.

The rule table 202 has a section for storing process step data for preparing and prosecuting an application in each state or country. This section will be hereafter referred to as "local step table section 208". The local step rule table 208 is basically derived by utilizing the common step table in the common step rule table 206. The data format in the local step rule table 208 will be seen from FIG. 3. The local step rule table 208 is set with respect to each country to file the application. Therefore, the local step rule table 208 is separated into a plurality of blocks for storing step data with respect to the corresponding state. Each of the blocks storing the step data of one table to file the application will be hereafter referred to as "local rule block 220". Each local rule block 220 is separated into a plurality of data sections. Each data sections will be hereafter referred to as "local step data section 2200". Each local step data section 2200 is further separated into a plurality of data areas. Each local step data section 2200 can be identified by country or state code set in a data area 221, the local rule block 220, and a route code in a data area 222 of the local rule block 220. By the state code in the data area 221 and the route code in the data area 222, one of the local step data sections 2200 can be identified. Namely, in the recent worldwide patenting system, there are a plurality of routes for filing and prosecuting an application. For instance, in order to file a patent application in the United States, the applicant can select a route to be taken among two routes, i.e. a first route for directly filing the patent application through an authorized person or directly to the United States Patent and Trademark Office, and a second route in which the application is filed with an International Bureau under the Patent Cooperation Treaty (PCT). When the application is filed in European states, such as United Kingdom, Federal Republic of Germany, the first route for filing an application directly is with a Patent Office or Patent and Trademark Office and each desired state will be referred to as "national route". The second route for filing the application under PCT will be hereafter referred to as "PCT route". Additional routes are available for filing the patent application with a European Patent Office established under an European Patent Convention (EPC). This third route to file an application in the European countries through the European Patent Office will be hereafter referred to as an "EPC route". In addition, some countries allow registration of patents allowed in other countries. Such registrations of other state's patents will be called "confirmation patents". Therefore, a route to file an application for registration of the confirmation patent can be taken in some states. The route for obtaining a confirmation patent will be hereafter referred to as a "confirmation patent route".

Therefore, the route code data area 2202 accepts entry of one of several predetermined route codes for identifying the route of the application. As set forth above, since the patent applications may be filed in the United States through two mutually distinct routes, different local rule blocks 220 would become necessary for the U.S. patent application. Similarly, since three routes can be taken for filing in European countries, such as United Kingdom, three different local rule blocks 220 have to be set for dealing with the United Kingdom Patent applications.

The state code in the data area 2201 and the route code in the data area 2202 serve as identification of the local rule block 220 and common throughout the step data set in the same local rule block. Therefore, these two data areas 2201 and 2202 are provided only in the first step data section 2200.

A data area 2203 is provided for accepting entry of a step number for setting one of the process steps in the common step rule table 206. Therefore, the data in the state number data area 2203 serves as an identification factor of selected ones of steps in the common step rule section table 206. Data areas 2204 and 2205 are provided for setting legally effective periods of the set local rule block and items to which the legally effective period is applied. These two factors become necessary in view of any revision of laws and/or rules in the state designated by the state code in the state code data area 2201. For instance, some additional process steps may become necessary when revisions of laws and/or rules occur in the corresponding states for accepting additional data. Also, some process steps may become unnecessary in view of the laws and/or rules revised. When the laws and/or rules are revised, a possibility of erroneous entry of data increases due to confusion of the operator.

For example, in the old patent law in the Federal Republic of Germany before Jan. 1, 1981, the application was examined and published after passing the examination for putting the allowed application into the public inspection. A predetermined period is set forth for filing an opposition. After expiration of the opposition period, a decision for granting is issued to issue a patent in response to payment of a granting fee. The laws have been revised and new laws became effective on Jan. 1, 1981. On the other hand, after Jan. 1, 1978, the application filed is first published at around 18 months after the first filing date, as the first publication. In the revised laws of 1981, the second publication will not be published. Therefore, it is not possible to file an opposition against the second publication. As compensation, a chance for filing an opposition is given after issuance of the patent. In order to adopt the computerized system for such changes of practice in the state or filing an application, the setting of the legally effective terms and the reference items is very useful. If the entry of data is made in the wrong step data block 2200, an error indication will be given and entry of data will be refused. For example, in the aforementioned revision in the Federal Republic of Germany, the revised laws are applicable for the application filed after the effective date Jan. 1, 1978 and Jan. 1, 1981. Therefore, in order to check whether the new laws are applicable for the specific application, the application has to be checked. Therefore, the reference item code to be set in the data area 2204 has to be the code indicative of the application date. If the specific application is filed before January 1, 1978, the local step data section 2200 is to have data entered that the first publication became invalid.

The data areas 2206, 2207 and 2208 are designed to receive entry of a step name, abbreviated step name and display name as set in the common step rule section table 206. It would be convenient to automatically enter the data in the data areas 2206, 2207 and 2208 in response to entry of the step number of the state number data area 2203.

A data area 2209 is provided for setting a process start flag code. The process start code glas is set for the first step of the sequence of steps in the step data block 2200 for indicating the first step. Therefore, for the steps to be performed subsequently to the first step, the start code data will never set. A data area 2210 serves as flag register for setting and resting an independent step indicative flag. Therefore, the independent indicative flag is set only for the steps. A data area 2211 stores a data active range of the independent step. Active range mean identifies the relationship of the independent step to other steps. Therefore, identification of the active range of the independent step range data area 2211 prevents irregular order of data entry. A data area 2212 is provided for the set/reset of a flag indicative of the repetition of each step. Namely, when the subject step has to be processed repeatedly, the step repeat flag is set in the data area 2212. A data area 2213 accepts setting of a flag indicative of presence of a next step. When a next step to go is present, the step number of the next step or steps are entered in data areas 2214.

Similarly to the aforementioned common step rule table 206, the data in the local step rule table can be modified as it becomes necessary by accessing the rule data file 20 through the keyboard.

Figure 5:
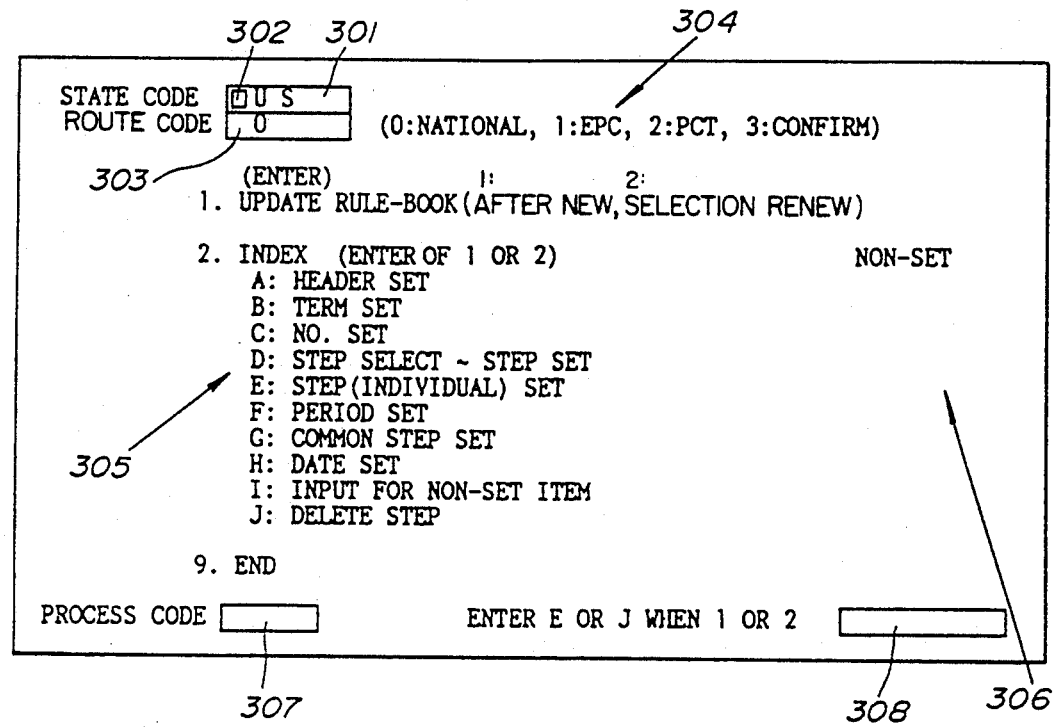
FIG. 5 is an explanatory illustration showing a rule data updating menu top be displayed on a display of the system of Fig. 1, for updating rule data.

A process for setting the steps in the local rule block 220 will bve described herebelow with reference to FIG. 4, in which a step setting program is shown. In the step setting process, at first, a step set item will be selected from an initial menu (not shown) displayed on the display unit 3. Selection of menu item, i.e. step set item, is performed through the keyboard 2, at a step 1001. In response to entry of a selection of the step set item through the keyboard 2, CPU 1 becomes active to access the display data file 50 to read out the second menu display format for step set at a step 1002. The read step set menu is then displayed on the display unit 3, at a step 1003. The format of the display displayed on the display unit at the step 1003 is shown in FIG. 5. Utilizing the displayed format, a step set is performed. At a step 1004, the state code (e.g. US as a code identifying the United States) is entered through the keyboard 2. For guidance of entry of the state code, a cursor 302 may highlight or blink at a block 301 on the display. The entered state code is written in the data area 2201 of the step data block 2200 of the local step rule table 208 through CPU 1. At the same time, CPU 1 transfers the state code data to the display unit 3 to indicate such in the block 301. Therefore, the state code entered through the keyboard 2 is indicated in the block 301. Subsequently, the cursor moves to a block 303 which is designed for indicating the route code. As seen from FIG. 5, the route code block 303 is displayed with a guidance of the route code at the section 304. The cursor 302 then highlights or blinks at the block 303 to require entry of their route code. The route code is thus entered through the keyboard 2 and written in the data area 2202 of the local step data block 2200 in the rule data file 20. At the same time, the entered route code is indicated in the block 303 of the display.

Figure 6:
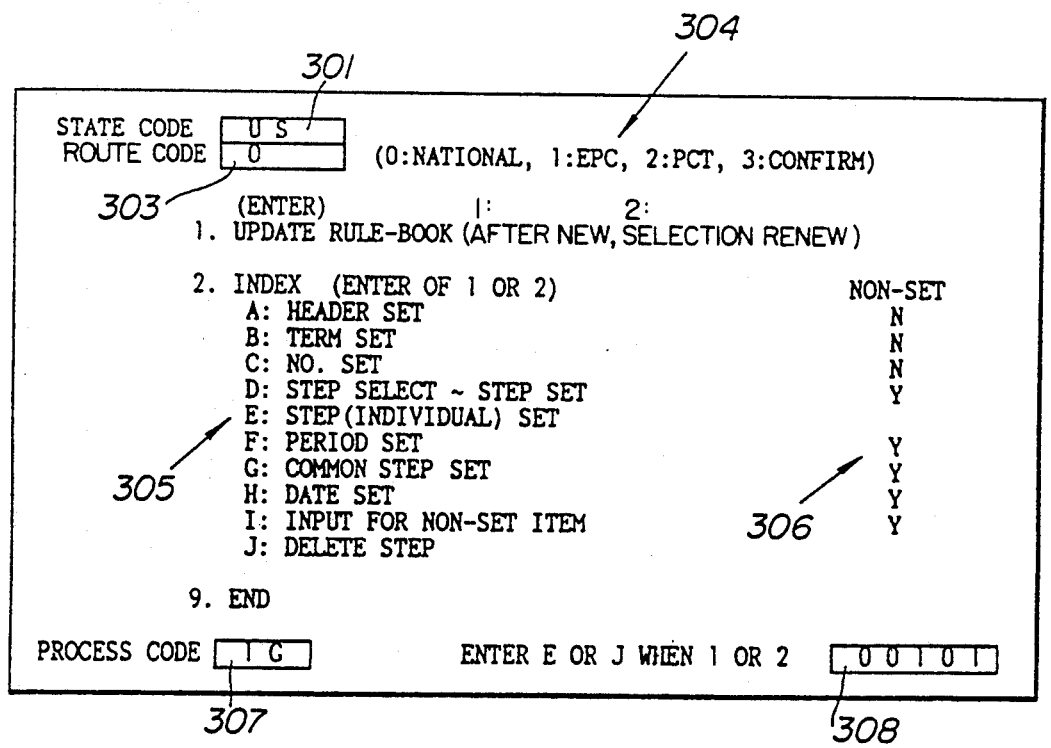
FIG. 6 is an explanatory illustration showing a form of display similar to that in FIG. 5, but showing an example of showing non-set items.

After the process in the step 1004, the CPU 1 checks items to be set in the local step data block 2200 which is set for processing the application in the entered state through the selected route. For instance, in the shown example, CPU 1 accesses the local step data block 2200 in the rule data file, which is adapted to process the United States patent application through national route. Then, CPU 1 locates items having not been set, at a step 1005. Thereafter, at a step 1006, set items and non-set items are displayed in the column 305 on the display, where index of the items are displayed. Set and non-set conditions are indicated in "Yes" and "No" in the column 306. In the shown embodiment, the indication "Y" indicates non-set items and "N" indicates already set items. Therefore, at the step 1006, the display changes from that in FIG. 5 to that in FIG. 6. With the display format as shown in FIG. 6, selection of step set and step select is made through the keyboard at a step 1007. Selection is first performed by entry of "1" or "2" for selecting a required operation between undating of the rule (newly setting of renewing or modifying the rule) and selection of item through the index. In the shown example, the non-step set; F: period set; G: common step set; H: date set; and I: input for non-set item. On the display, the item E: step (individual) set and J: delete (individual) step are left blank. This blank indication means that these items can be selected irrespective of set and non-set conditions of the steps. Since these items are directed for treatment for an individual step, when these items are selected, selection has to be made with an identification of the step to be treated. Therefore, entry of the step number is required. The step number entered through the keyboard is displayed in the block 308 on the display. The selection command "IG" is entered through the keyboard 2. This means that the required job is updating the common step rule table 206. CPU 1 thus displays the selected job indication in a block 307 and accesses the common step rule table 206.

In order to newly set the common step rule table 206 or local step rule table 208 or modifying those tables, one of the job items "1G", "1D", "1E" and "1I" is to be selected at the step 1007. If the job item "1G" is selected as illustrated, updating of the common step rule table 206 is performed subsequently. On the other hand, when the job item "1D" is selected selection of the local step rule table 208 is performed and when the job items "1E" pr "1I" are selected, updating of the local step rule table is performed. Therefore, CPU 1 checks the entered job code at a step 1008. When the entered job code is "1G" a process through the steps 1009 to 1012 is performed. On the other hand, if the selected job code is "1D" a process through steps 1013 to 1016 is performed. If the selected job code is "1E" or "1I", processes through the steps 1017 to 1025 are performed.

In the process through the steps 1009 to 1012 for updating the common step rule table, the common step rule table 206 is accessed and at the same time, the display format adapted for updating of the common step rule table, as shown in FIG. 7 is read out from the display data file 50, by CPU The read display format is displayed on a display unit 3 at a step 1010. Utilizing the display of FIG. 7, each step forming part of the common steps is entered at a step 1011. Entry of the common steps is performed by inputting the step numbers in the block 2101 and inputting step names, abbreviated names and display names in the blocks 2102, 2103 and 2104. By repeating entry, the common step rule table is updated, at a step 1011. During this process, the display in the format of FIG. 7 is updated every time entry of one step is completed. After completing entry of all of the steps to be entered, the common step rule table 206 is again stored in the rule data file 20 at a step 1012. After the step 1012, the process goes END and the display 3 is returned to an initial display format to be ready for accepting other jobs.

On the other hand, when the job item "1D" is selected at the step 1007, the process enters the sequence of steps 1013 through 1016 for selecting steps from the common step rule table 206 necessary for prosecuting the application in the state and route identified in the step 1004. In order to allow selection of the steps from the common step rule table 206, CPU accesses a display format adapted to perform a step selection for the formation of the local step rule table 208 with respect to the identified state and route, at a step 1013. Therefore, the display format as shown in FIG. 8 is displayed on the display 3. As will be seen from FIG. 8, the display is a constituted column 310 for accepting entry of a number, such as "01" for selecting each common step, a column 311 showing steps already selecting, a column 312 indicating the step numbers and a column 313 indicating step names. In the shown example, the steps "001 = filing application and receiving official filing receipt"; "201 = filing a response to the merits of the office action in the United States and Canada", "203 = receiving a final office action in the application in the United States and Canada"; and "204 = filing an amendment under the United States Rule 1.116 in response to the final office action in the United States" are already selected. This is indicated in the column 11 in a form of "01". As will be seen from FIG. 8, the steps indicated "00" in the corresponding column 311 are not necessary steps for prosecuting the patent applications in the United States. Therefore, these steps are not included in the local step data block 2200 adapted to prosecute the applications in the United States through the national route. As will be appreciated, the step selection is performed in view of the patent laws, patent practices and so forth in the country the application is filed in. Therefore, if the laws or practices are changed, a modification of the local step data block 2200 for the subjective country becomes necessary. For instance, in the shown embodiment, when the United States revises the patent laws and introduces a system for performing examination in response to the applicant's request, which may correspond to a "request for substantive examination", then, the step "008" has to be incorporated in the local step data block 2200 for prosecuting the national route application in the United States. Therefore, in such case, entry through the keyboard 2 has to be made for additionally selecting the step "008" by entry of the number "01" in the corresponding column 310, at a step 1015. Entry of a selection code which is number e.g. "01", is repeated until all of the necessary steps are selected. Every time there is completion of selection of one step, the display 3, of FIG. 8 is updated. After completing selection of all the necessary steps, the local step data block 2200 is stored in the local step rule table 208 of the rule data file 20, at a step 1016. Then the process goes END.

It should be appreciated that, in some states, it will become necessary to require different processes in the steps identified by the same step number and step name. In such case, mutually distinct steps have to be set under the same step number and step name. In such case, the number of steps to be indicated at the corresponding column 311 becomes "02". In other words, when one step is already selected in the local step data block as a single step, this can be made two by indicating the increased number of steps, e.g. "01" in the column 310. In such case, the updated number of the step becomes "02" in the column 311. In order to distinguish the different steps under the same step number and the step name, the step number in the local step data block 2200 is set as five digit code. The five digit code is formed with the first three digits indicating the step code as used in the common step rule table 206 and the last two digits identifying one of a plurality of steps to be identified the same step number of the common step rule table. For example, when the step 202 is additionally selected to have two mutually distinct steps under the step number "202" and the step name is "RESPONSE (MERIT) (US/CA)", respective steps are distinguished from each other by giving distinct local step numbers "20201" and "20202".

Figure 9:
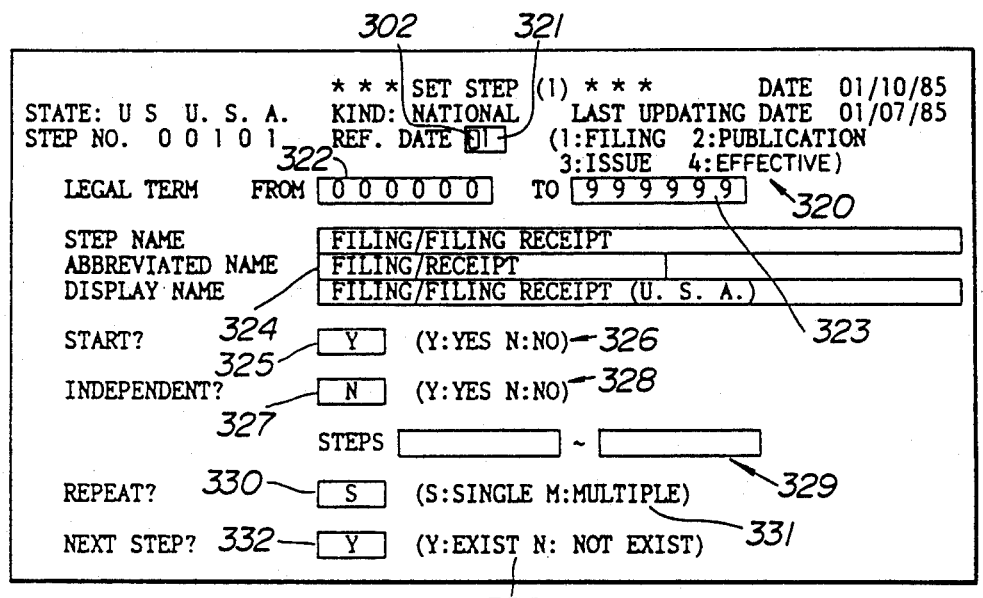
FIG. 9 is an illustration showing an example of a format of display for setting local steps for prosecution of each of the specific countries.
Figure 10:
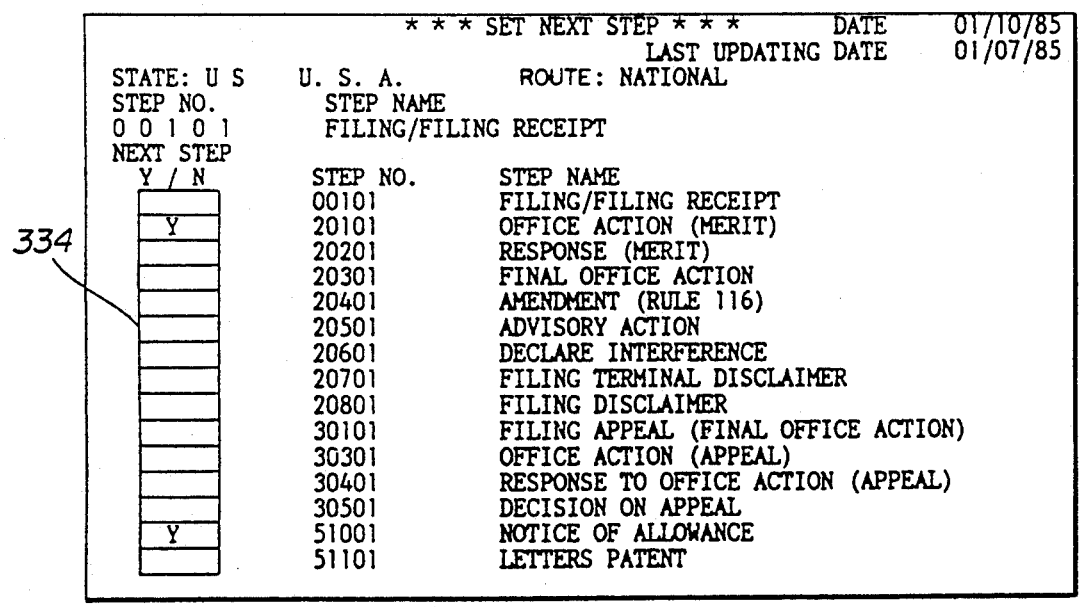
FIG. 10 is an illustration showing an example of a format of display for setting the next step with respect to each designated country.

In the process through the steps 1017 to the step 1025, updating of the local steps is performed. Updating of the local steps is performed utilizing the display formats as shown in FIGS. 9 and 10, which display formats are selected from the display data file 50. Therefore, when the job code as checked at the step 1008 is "1E" or "1I", the CPU 1 reads the display format of FIG. 9 at the step 1017 and displays it on the display 3 at a step 1018. Against the display format of FIG. 9, data input to the necessary data are performed as step 1019 through the keyboard. As a guidance for the entry of necessary data, cursor 302 may be highlighted or blinked at respective items which require entry of data. The cursor 302 may move among various entry blocks in a given order.

As will be seen from FIG. 9, setting of the local steps is formed by entry of reference date code, i.e. one of application date ("1"), second publication date ("2"), the issue date ("3") and the effective date ("4") according to the guidance in the column 320. Among the reference dates as indicated in the guidance of the column 320, the "effective date" means a date on which the step action starts. For instance, in case of an U.S. office action, the mailing date will be treated as the effective date on which the office action processing step comes into effect. The reference date is set in the column 321 on the display of FIG. 9 through the keyboard 2. In response to setting of the reference date, the cursor 302 moves to the column 322 to require entry of the beginning date of the legally effective term of the subject step. Therefore, the beginning date of the legally effective term is set in the column 322. Subsequently, the end date of the legally effective term is set in the column 323. By setting the beginning date and end date in the columns 322 and 323, the term in which the subject step is defined. This means that when the application has a reference date, e.g. application date ("1") in the shown case, within the legally effective term, the subject step is available in prosecuting the application. On the other hand, if the reference date is out of the term, the subject step has to be avoided in prosecuting the application. In the shown example "000000" is set in the column 322 and "999999" is set in the column 323. This means that the subject local step ("00101"=FILING/FILING RECEIPT) is always available to prosecute the applications filed in any date. The step name, abbreviated name and display name in the column 324 may be automatically indicated in relation to the step number of the subject step. If necessity happens to change one of the step abbreviated names and display names, it would be possible to access the corresponding column through the keyboard and update the indications of the corresponding columns.

Subsequently, start flag, the independent flag, the step repeat flag and the next step flag are set respectively in the blocks 325, 327, 330 and 332 guided by the guidance in the columns 326, 328, 331 and 333. When the independent flag is "N" and thus indicates that the step has some relationship to other steps in view of the procedure of prosecution in the subject state, the step range only in which the subject step processing occurs is set by the step numbers of the beginning step and end step of the step range.

After completing entry of the required data against the display format of FIG. 9 at the step 1019, the updated step is stored as part of the sequence of steps in the local step data block 2200, at a step 1020. Thereafter, the next step flag in the block 332 in the updated step is checked at a step 1021. If "N" is set in the block 332, the process goes END. On the other hand, when "Y" is set in the block 332, the CPU 1 accesses the next page of the step set display format, which next page may be in a format shown in FIG. 10, for accepting entry of the next step data, at a step 1022 and display the accessed display format in FIG. 10 on the display 3 at a step 1023. As will be seen from FIG. 10, the display format as displayed at the step 1023 is in a form of a list corresponding to the local steps set in the local step data block 2200. The next steps are selected among the listed steps, which next step possibly occurs subsequently of the subject step. For instance, in this shown example, the subject step is "00101=FILING/FILING RECEIPT", possibly occurring steps are "20101=OF- FICE ACTION (MERIT)" and "51001 NOTICE OF ALLOWANCE". Therefore, these terms are selected as the next step to the step "00101". Selection flags "Y" are thus set in the corresponding columns 334 on the display, at a step 1024. This process is performed until all of the possible next steps are entered. During this process, a display in a format of FIG. 10 is updated everytime one next step is set. After all of the possible next steps are set through the steps 1023 and 1024, the process goes END. By the process as set forth above, the step tables for processing each individual application can be established in the rule data file 20.

Utilizing the rule data file 20 as set forth above, process or step of prosecution of each individual application to be filed in various countries are managed or controlled. The management or control of the prosecution of applications, includes updating data with respect to respective applications, monitoring process operations in the application, with an agent or the like and so forth, and issuing instructions to the agents are included. Updating of data with respect to individual applications, includes entry of incoming jobs, such as a response to an office action issued for the subject application, payment of an issue fee or other necessary fee, and so forth are included.

On the other hand, as set forth above, the rule data file 20 further includes the time-control table 204 storing data necessary for setting the due date, extended response term and so forth according to the laws and rules in respective countries to file the application. As is well known, the term calculation, term allowed for responding to an office action and so forth are different in different countries. Therefore, in order to make up the time-control table 204, it should be preferable to establish a plurality of tables for performing time control in respective countries. According to the present invention, the memory area provides for the time-control table 204 and is thus divided into a plurality of memory blocks, each of which is adapted to store one table designed for prosecuting applications in one country. The table established with respect to the corresponding country and route in order to file the application will be hereafter referred to as "local time-control table". Similar to the rule table 202, the timer-control table 204 can be updated upon when necessary.

Figure 11:
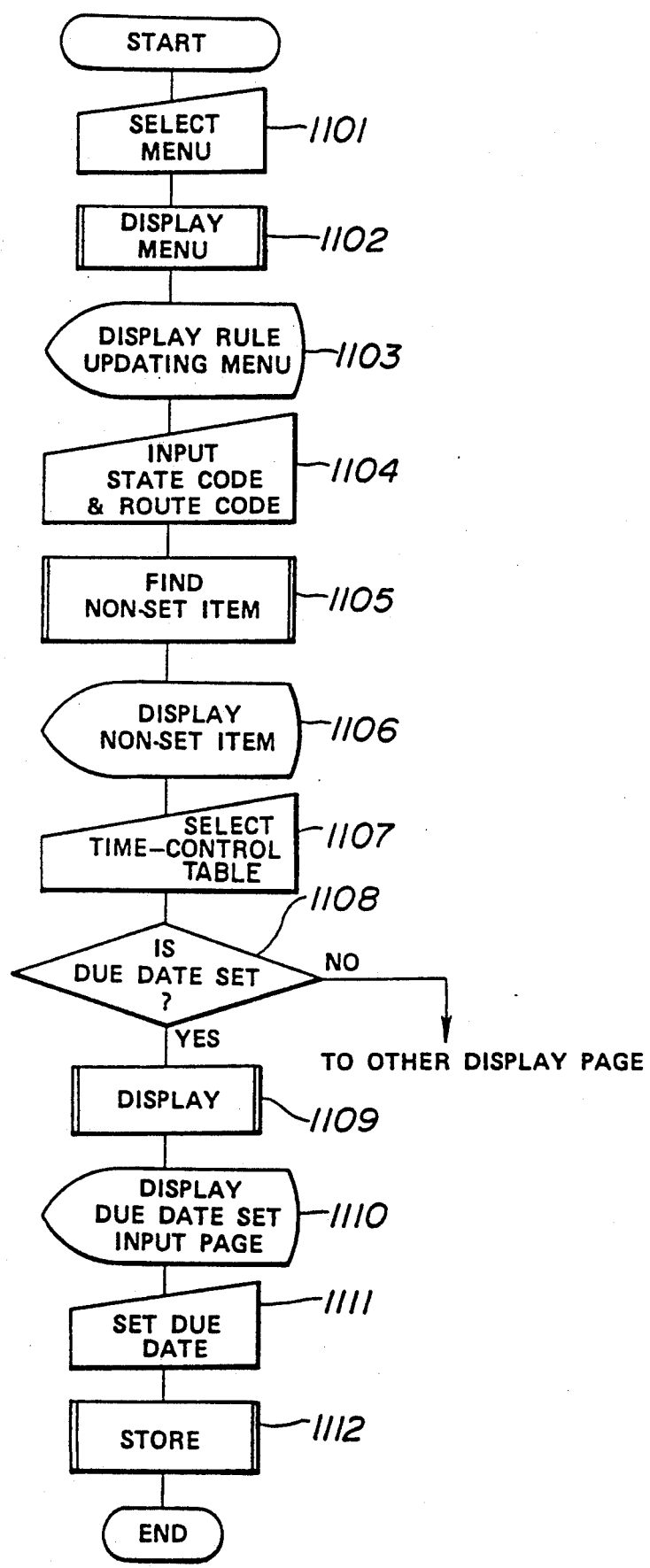
FIG. 11 is a flowchart of a due date setting program to be executed by the system of FIG. 1.

FIG. 11 shows a flowchart of a time-control table setting program to be triggered when time-control table is to be updated. When the time-control table setting program is triggered at a step 1101 by entry of a command through the keyboard 2, CPU 1 accesses the display data file 50 to read out the display format. At this time, CPU selects the display format of FIG. 5 for allowing selection of required job. Therefore, the display format of FIG. 6 is then displayed on the display 3 at a step 1103. For updating the time-control table 204, the item "1F" is to be entered through the keyboard 2. Therefore, at a step 1104, the state code and the route code are entered through the keyboard 2. The input job code is displayed on the block 307 on the display, as shown in FIG. 6. In the shown example, the "US" is entered as the state code selecting the United States and "O" is entered as the route code selecting the national route. In response to the entry of the state code and route code at the step 1104, CPU 1 performs a search for finding out non-set items at a step 1105. Therefore, the non-set items are displayed on the display in a format of FIG. 6. At this diaplay condition, the job code "1F" is entered through the keyboard 2, at a step 1107 in order to enter into time controlling setting routine. The entered job code is checked whether it is "1F" demanding the time-control table setting operation or other operations, at a step 1108. If the job code entered is other than "1F", the operation enters into demand operation other than time-control table setting operation. On the other hand, when the entered job code is "1F" updating of the control table is demanded.

Then, at a step 1109, CPU 1 accesses a display format of FIG. 12 for accepting entry of information for calculating a term with respect to actions identified by step code, which display format is stored in the display data file 50. The selected display format of Fig. 12 is displayed on the display 3 at a step 1110. As will be seen from FIG. 12, the display format of Fig. 12 includes blocks 340, 341, 342, 343 for accepting entry of time-control data. The blocks 340 and 341 are adapted to accept data of the start of the term to be set. For instance, the block 340 is adapted to accept step number, e.g. "201" of the step at which the term starts. Similarly, the block 341 is adapted to accept date code, e.g. "201" as a beginning date of the term. The blocks 342 and 343 are adapted to accept the data of an end of the term to be set. For instance, the block 342 accepts the step number for identifying a step in which the date data is stored in the under mentioned block 343. The block 343 accepts end date data for taking the action identified in the block 342. In the example of FIG. 12, since the step number of the beginning step number is "201", indicative of an occurrence of an office action, the end step number "20101" indicative of the receipt of the office action in the local step rule block 206. The end date data when indicates "202" which is indicative of the final due date for responding to the office action.

The display format of FIG. 12 further includes blocks 344, 345, and 346 for accepting term data and extension data. In case of the shown example, since the U.S. examiners usually allow a three-month shortened statutory period, and up to 6 months for responding to an office action on the merits, the block 344 is set at "00 03 000". In this entered data, the first two digits indicate year factor, the second two digits indicate month factor and the last three digits indicate day factors. Therefore, the data entered in the block 344 indicates a 3 months period from the mailing date of the office action.

Data entered in the block 345 indicates a unit extension term obtainable for responding to the office action. Similar to the foregoing response period data in the block 344, the first two digits indicate year factor, second two digit indicate month factor and the last three digitrs indicates day factors. On the other hand, the block 346 accepts two digit data indicative of possible maximum occurrence of extension for extending the term for responding to the office action. These data are set in respective blocks 340, 341, 342, 343, 344, 345 and 346 through the keyboard 2 at a step 1111. After setting the data in the local time-control table for prosecuting the U.S. patent application through national route, the updated local time-control table is stored in the corresponding memory block in the rule data file 20. For instance, in the example of FIG. 12, when the office action on the merits is received from the U.S. Patent and Trademark Office for the U.S. patent application through the national route, the due date is calculated as 3-months from the mailing date of the office action according to the information set in the block 344. Extension data may be entered for three times as required or requested. Everytime the extension is set, the due date is extended for one month.

Figure 14:
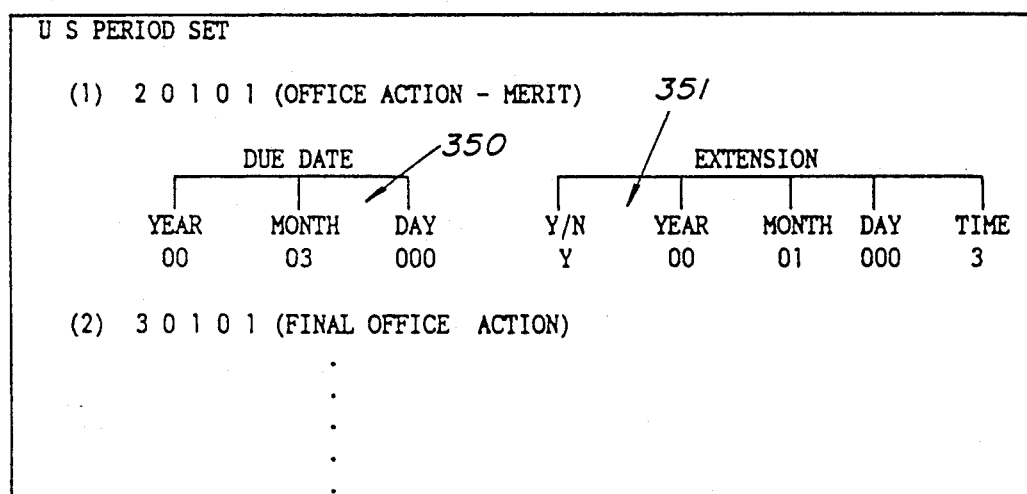
FIG. 14 is an explanatory illustration showing a due date setting data format.

FIGS. 13 and 14 show data formats stored in the time-control table 206 of the rule date file 20. The local time-control table in the time control table 204 is searched with respect to the state and route. Based on the identified state and route, an index of FIG. 14, which corresponds to the designated state and route, is accessed. With the accessed index file, one of the set files, e.g. "HEADER SET FILE", "PATENT TERM SET FILE", "NUMBER SET FILE", "PERIOD SET FILE" and so forth, is accessed. In order to calculate the due date, the item of "PERIOD SET FILE" is accessed to read out the set data in the local time-control table. By this, the local time-control lable of the corresponding state, corresponding route, and corresponding step is read out. The read out part of the local time-control table is as shown in FIG. 14. As shown in FIG. 14, each data to be identified by entry of the step number e.g. "20101 (=office action of the merits)", is constituted due date calculation data in block 350 and an extension period calculation data in a block 351. The shown example in FIG. 14 corresponds to the data entered against the display of FIG. 12 as set forth above. Based on the mailing data of the office action as entered as a reference date, and due date calculation data and extension period calculation data, the due date for responding to the office action and the extended due date can be calculated.

An actual process in calculating the due date and extended due date will be discussed later with respect to a time-control program to be performed by the preferred embodiment of the system.

According to the preferred embodiment as set forth above, since the data for calculation of the due date can be read out by identifying the corresponding step number, it simplifies setting the time-control date for each individual application significantly. Furthermore, since the aforementioned due date and extended due date calculations are internal processes as in the system it becomes simpler to significantly shorten the process period.

With utilizing the rule table 202 and the time-control table 204 in the rule data file set as set forth above, management for each individual patent application is performed.

As will be appreciated, after setting the rule data file 20, particulars, such as applicant's docket number or reference number, basic application data, title of the invention, identification of the inventor or inventors, states to file the application, route to be taken to file the application, identification of persons in charge of the application, persons to be appointed and so forth are set in the case file 10 with respect to each invention or application. Entry of subsequently occurring data, such as filing date, application date, first publication number, first publication date, occurrence of office action and so forth are controlled or managed according to the rule set in the local step rule table 208 and the local time-control table in the time-control table 204. Furthermore, time-control for watching the process in preparation of an application, preparation for an office action and so forth are performed by the preferred embodiment of the managing system according to the invention. In order to store the entered data with respect to each individual application, the case data file 30 is constituted by a plurality of individual data blocks 310, each of which is adapted to store the file data of each individual application. Each of the data blocks 300 provided in the case data file 30 is in a data format as shown in FIG. 16 and will be hereafter referred to as "case file 300". As will be seen from FIG. 16, each of the case files 300 includes a block 360 for accepting an applicant's docket number or reference number. A block 362 is provided for receiving the state code. A block 363 is adapted for receiving filing particulars, such as basic application number, based on which priority right under the Paris Convention can be claimed, the basic application date, title of the invention, inventor's names, filing date, application number, first publication date, first publication number, second publication date, second application number, issue date, patent number, attorney's or agent's name, attorney's or agent's docket number, indication of family application filed in other countries, and so forth. The case file 300 also has a file history storing section 367 for storing hysterisis of the prosecution of the application. The file history storing section 367 is constructed by a column 363 to be set by step numbers, a column 364 to set a date of entry of data with respect to the corresponding step, a column 365 to set a data number which is set in order of entry, and a column 366 to set a date as an occurrence date data. In the shown example, the entered step number "00101" identifies the filing of the application. As indicated in the column 366, the application has been filed on Jan. 2, 1984. This filing data has been entered as first data on Jan. 4, 1984. Likewise, the hysterisis data will be accumulated in the file history storing section 367 of the case file.

For an example, a process of taking care of an office action will be described herebelow with reference to FIG. 15 through 20. FIG. 15 is a flowchart of an office action data setting program which has to be triggered for setting data concerning an office action, such as a due date, intermediate dates in processing office actions and so forth. Upon entry into a process of the office action data setting program of FIG. 15, the keyboard 2 is operated to access an item of setting of office action data against an initial menu initially displayed on the display 3, at a step 1201. In response to selection of the item of the setting of office action data through the keyboard, CPU I becomes active to access a display format of FIG. 17, at a step 1202. The selected display format of FIG. 17 is displayed on the display 3 at a step 1203. Here, the case number (applicant's reference number, e.g. "S84P100US00") is set in a block 370 on the display format through the keyboard 3 at a step 1204. At the same time, at the step 1204, a selection item "1" or "2" is set in a block 371 on the display 3 through the keyboard. These selection items indicate a new set of step data ("1") or modifying of the already set step date ("2").

The entered selection item ("1" or "2") is checked at a step 1205. If the selection item is "1" it indicates demand for a new setting step data, the process steps 1206 to 1209 are performed. On the other hand, when the entered selection item is "2", the process steps 1210 to 1213 are performed.

In the process steps 1206 to the step 1209, the case file 300 in the case data file 30 of the corresponding application, as identified by the applicant's reference number set in the step 1204, is searched to find the last hysterisis, at the step 1206. Namely, in the step 1206, the dates set in the column 364 of the subject case file 300 are searched. This process is intended to know the last step in the progress of the prosecution of the application so as to avoid an illogical entry of data for the wrong item. After finding out the last hysterisis at the step 1206, the step number set in the column 363 with respect to the most recent date in the column 364 is read out from the file history storing section 367 of the case file 300. At a step 1207, the local step rule table 208 in the rule data table is searched to find out the corresponding step. With respect to the searched step in the local step rule table 208, the data concerning the next step or steps in the blocks 334 in the local step rule table in FIGS. 9 and 10, are read out at the step 1207.

In the shown example, the last hysterisis is filing the application and receipt of an official filing receipt, as identified by the step number "00101" as shown in FIG. 16. The next step, as identified in the U.S. local step rule table 298, is receiving an office action as identified by the step number "20101" or receiving of a notice of allowance as identified by the step number "51001". At the same time, in the step 1208, all of the steps independent of other steps as indicated in the block 327 of the display format of FIG. 9, are read out. Therefore, the CPU 1 operates the display control section in the control section 60 for modifying the display format of Fig. 17 to that shown in FIG. 18.

As will be seen from FIG. 18, the modified display includes indications of next steps in a column 372 and independent steps in a column 373. These indications of the next step and the independent steps show the status of the application and data to be input. Therefore, the operator can be guided by the guidance indication on the display 3.

On the other hand, when renewal of the already set step is designated by entry of "2" in the block 371 of the display format of FIG. 17, the process goes to the routine of steps 1210 to 1213. At the step 1210, CPU 1 accesses the file history section 367 of the case file of the application identified by the reference number set in the step 1204. Then, the hysterisis of the application is read out. Based on the read hysterisis, CPU 1 performs search against the local step rule table 208 of the corresponding state and route, in order to read out the step name or names corresponding to the step number or numbers read out at the step 1210, at a step 1211. Then, at a step 1212, CPU 1 prepares a modification of the display format of FIG. 17 to indicate the hysterisis of the subject application in a column 374 on the display, as shown in FIG. 19. The display format as modified at the step 1212 is displayed on the display 3 at a step 1213 As will be seen from FIG. 19, since only step "00101 (=filing application and receiving of an official filing receipt)" has already been set with respect to the application identified by the reference number "S84P100US00" as shown in FIG. 16, the step number "00101" and the step name "FILING/FILING RECEIPT" is displayed on the display 3 at the step 1213.

After the step 1209 or 1213, the process does an updating routine of steps 1214 through 1218. At first, at the step 1214, against the display format of FIG. 18 or FIG. 19, with utilizing the step number and step name displayed on the display as the guidance, a step number for identifying the step to update is entered through the keyboard 2. At a step 1215, CPU 1 accesses the display data file to locate a display format adapted for accepting entry of data for the step identified at the step 1214.

When the entered step number at the step 1214 is "20101" for entry of an office action data, CPU 1 selects a display format shown in FIG. 20. FIG. 20 shows a display format for accepting data indicative of progress in handling office action. The display format includes a block 375 for accepting entry of an official mailing date of an office action. In the shown example, the indication in the block 375 shows that the office action was mailed on Dec. 1, 1985. The display format further includes blocks 376 for accepting date data or an attorney's or agent's mailing date, blocks 377 for accepting date date of receipt of the office action in the application, blocks 378 for accepting proposed date data by which an agent wants to receive instructions for responding to the office action. Blocks 379 for the entry of occurence of extension for the response period, and blocks 380 to set a due date. Furthermore, the display format includes blocks 381 for entering date data for instruction data and blocks 382 for receiving entry data of filing a response to the office action.

The display format of FIG. 20 further has a block 383 for accepting entry of a mailing date of a final office action, a block 384 for accepting entry of agent's mailing date of the final office action, a block 385 for accepting entry of applicant's receipt date, a block 386 for accepting proposed instruction date set by the agent, a block 387 for setting an occurence of an extension for the response term to the final office action, a block 388 for accepting entry of due date, a block 389 for accepting entry of an instruction date on which instructions are given to the agent, and a block 390 for accepting entry of response data on which a response to the final office action is submitted. Furthermore, the display format is adapted to receive interference data, i.e. dates of occurence of interference in blocks 391, a terminal disclaimer data, i.e. indication of relevant case number, instruction date, and submission date, in blocks 392, 393 and 394, and a disclaimer data, i.e. instruction date and submission date, in blocks 395 and 396. In addition, the display format includes blocks 397 and 398 respectively adapted to accept command for outputting a letter to the agent and for entry of information concerning the references cited in the office action.

The display format of FIG. 20 is displayed on the display 3 at a step 1216. Against the display format as displayed at the step 1216, entry of data indicative of progress in processing the office action is performed, at a step 1217. Processing in the steps 1216 and 1217 is repeated until all data are entered. After completing entry of all the data, the office action data entered is stored in the case file. At the same time, the file history storing section 367 is undated.

Figure 21:
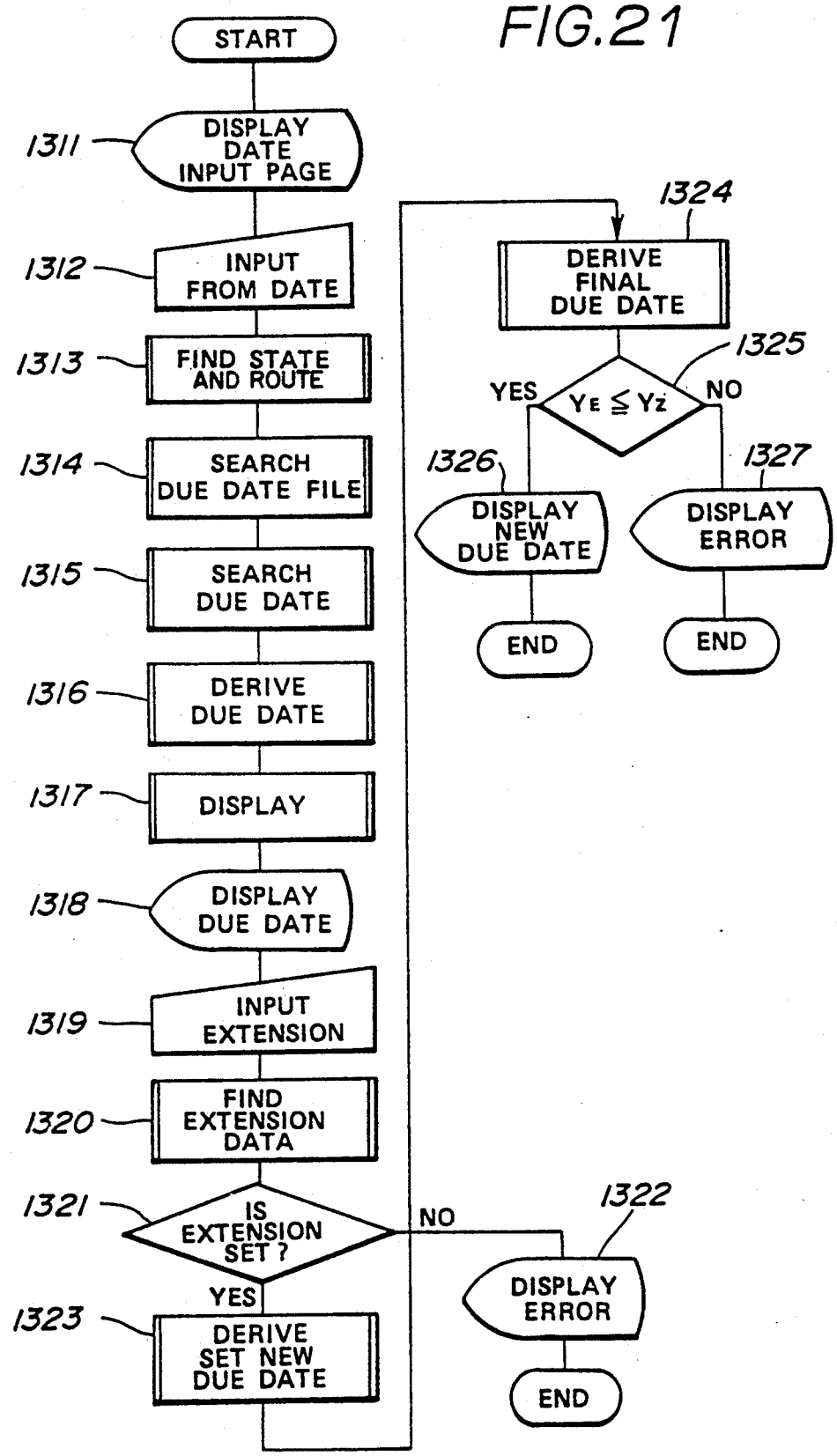
FIG. 21 is a flowchart of a final date setting program in an intermediate action processing, which is to be executed by the system of FIG. 1.

During the process of processing the office action, the office action data to be set against the display format of FIG. 20 has to be updated from time-to-time according to the progress in treatment FIG. 21 shows a subroutine to be triggered in the process of the step 1217 and 1218 of the program of FIG. 15.

In the step 1216, the selected display format of FIG. 20 is displayed on the display 3. At a step 1312, data entery is performed. At this step, entry of the official mailing date, agent's mailing date and receipt date in the blocks 375, 376 and 377 is performed. In the example shown, an office action is mailed from the United States Patent and Trademark Office on Sep. 25, 1985. Therefore, the PTO mailing date is set as "850925 in the block 375. Simultaneously, the agent's mailing date, e.g. Oct. 1, 1985 ("851001") and the receipt date, e.g. Oct. 9, 1985 ("851009") are set in the blocks 376 and 377 through the keyboard 2. Also, in the example shown, the agent requires the applicant's instructions for responding to the subject office action by Dec. 25, 1985 ("851225"), this date data is set in the block 378 as the agent's proposed date. After the step 1312, the state file is accessed at a step 1313 to locate the state data and route data. After this, at a step 1314, the local step rule table is searched in terms of the located state code, the route code and step number. For instance, in the example shown, since the application has been filed in the United through the national route, the item of the state code "US" and the route code "0" is selected at the step 1313. After this, the period set file in the table of FIG. 13 is selected at a step 1315. In response to this, the time calculation table of FIG. 14 is selected. Utilizing the calculation table of FIG. 14 and the set data, the due date for responding to the subject office action is derived at a step 1316. Namely, in the U.S. Patent practice, the usual 3-month response period starts from the official mailing date, e.g. Sep. 25, 1985. Therefore, this date in the block 375 is taken as the "FROM" date data. Then, the data "00 03 000" set in the calculation table is read out and (Y due date)=from date+"00 03 000" is calculated for deriving the due date in the step 1316. Then, based on the derived due data, the display format is modified at a step 1317 and displayed on the display at a step 1318. At this time, the modified display format incorporates the due date data in addition to the data entered at the step 1312.

To the modified display made at the step 1318, extension data is entered at a step 1319. In practice, the entry of the extension data is done by setting "Y" in the block 379 of the displayed format through the keyboard 3. When the extension flag "Y" is set in the block 379, the CPU retrieves the extension data in the local step rule table 208, at a step 1320. In practice, the CPU checks the maximum length and number of unit term extensions available for responding to the office action. In practice, the statutory period in prosecution of the U.S. Patent application for responding to the office action is 6 months, and most U.S. examiners set shortened statutory periods of 3 months. Three additional one month extensions may be allowed. Therefore, the maximum number of extensions in U.S. patent application is 3.

As is "well known, in United Kingdom Patent applications, extensions extension of response periods are generally not avaiable. Therefore, the local step rule table 208 for the United Kingdom national route application will have no data about extension in the block 345 and 346 in the local time-control table set for the United Kingdom Patent application. Therefore, when extension flag "Y" is set for the United Kingdom Patent application, this is clearly wrong. Therefore, such an entry must be rejected or an error indication displayed, In order to assure this, CPU 1 checkes the local time-control table at a step 1321. If the extension flag is set at the step 1319 but no extension data appears in the blocks 345 and 346 in the local time-control table of FIG. 12, an error indication is displayed in a block 399 in the display format of FIG. 22, at a step 1322. On the other hand, when extension data is set in the blocks 345 and 346 of the local time-control table of FIG. 12, a new due date is calculated and derived based on the extension data in the blocks 345 and 346 of the local time-control table of FIG. 12 and already set due date, at a step 1323. After this, the final due date with all possible maximum extensions is also derived at a step 1324. The new due date $Y_E$, as derived at the step 1323, is compared with the final due date $Y_Z$ derived at the step 1324, at a step 1325. When the new due date YE is earlier than or equal to the final due date $Y_Z$, the new due date is displayed in the block 380. On the other hand, when the new due date $Y_E$ is later than the final due date $Y_Z$ as checked at the step 1324, then error indication is given in the block 399, at a step 1327.

In the embodiment shown, the extension flag "Y" is erased after setting the new due date after a time extension. Therefore, the due date is extended by setting the extension flag "Y" in the block 379 everytime the extension of the response period becomes necessary. As set forth above, when an extension is not allowed in the subject country or when too many extensions are made causing the error sign to be displayed, the extension flag "Y" may be canceled. By cancellation of the extension flag, the last set due date is displayed in the block 380.

Figure 23:
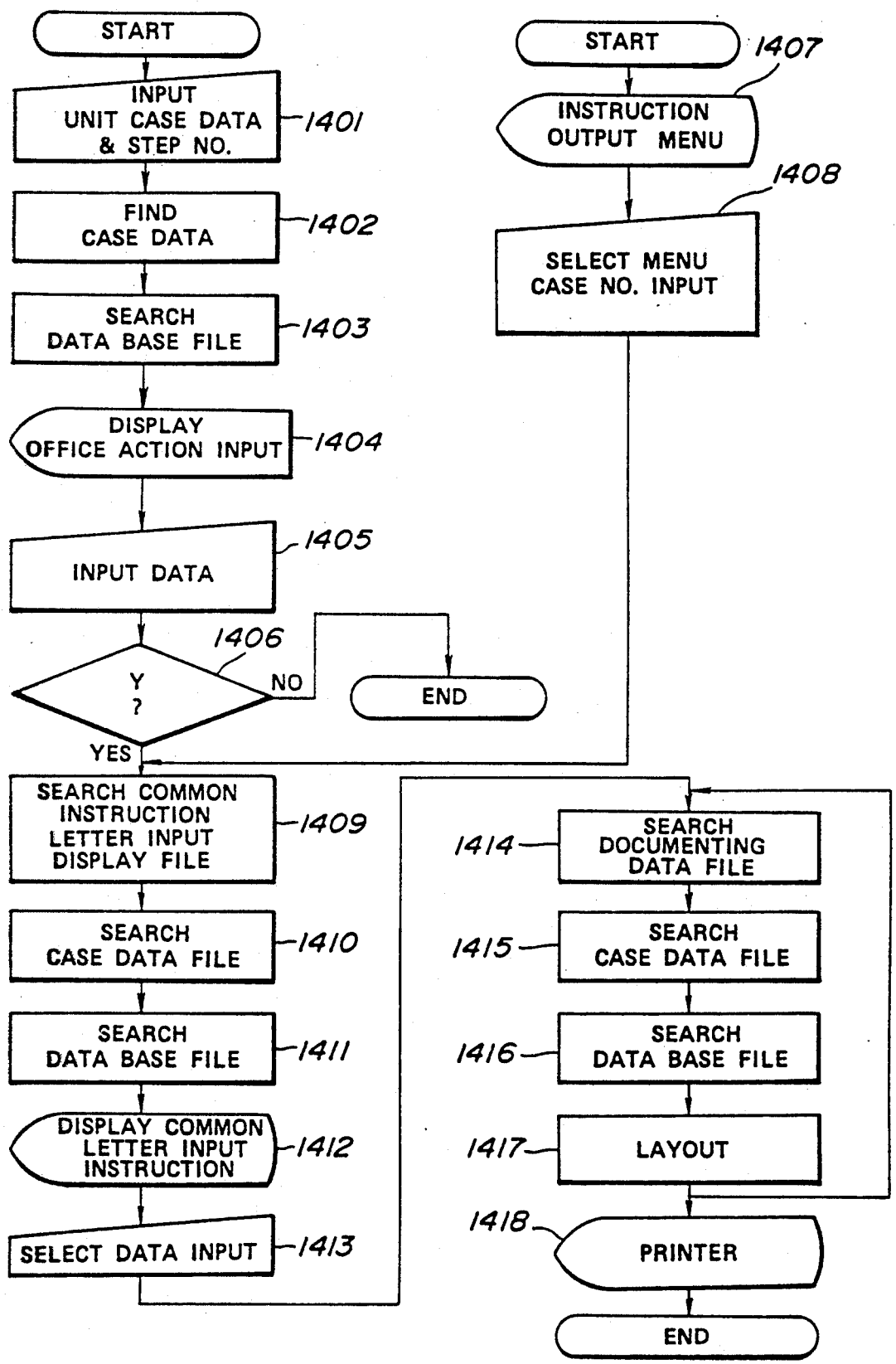
FIG. 23 is a flowchart of a printing program for printing instructions for agents.

During prosecution of the application, the necessity of sending instructions or request letters for the agents may arise. In order to process various letters according to the progress of prosecution of the application applications, the document data file 40 and documenting control section and documenting item-access control section in the control section ..60 are provided. So as to process the letters, a documenting control program of FIG. 23 is set in the preferred embodiment of the system. The documenting control program is in practice accessible at various steps of prosecution of the applications. In FIG. 23, there have been illustrated two routes for accessing the documenting program. For instance, one route for accessing the documenting control program is subsequent to processing of the office action data processing, as set forth with respect to the flowcharts of FIG. 15 or FIG. 21. The office action data processing contains various steps as set out with reference to FIG. 15 and FIG. 21. These steps have been schematically shown as the previously disclosed steps 1401 through 1406.

The important thing to note with respect to the routine through the steps 1401 to 1406, is that setting of the letter flag "Y" is performed at an input stage. The letter flag is checked at step 1406. When the letter flag "Y" is not set in the block 397, the process goes to end. On the other hand, when the letter flag "Y" is set in the block 397 during input stage at the step 1405, process enters into the documenting routine of steps 1409 to 1418.

In the other route, the letter processing routine of steps 1409 to 1418 is triggered by accessing the corresponding item through a menu in FIG. 24. Therefore, at a step 1407, a documenting item selection menu of FIG. 24 is displayed on the display. From the documenting item selection menu of FIG. 24, a desired document item is selected through the keyboard 2 at a step 1408. At the step 1408, a reference number is entered for identifying the application, about which the letter has to be prepared.

In the example shown, the letter flag "Y" is set in the block 397 at the step 1405 after entry of data for processing an office action or the item "12 (=INSTRUCTIONS FOR RESPONDING TO OFFICE ACTION/OPPOSITION)" is selected at the step 1408. A common display format of FIG. 25 is selected from the display format stored in the display data file, at step 1409. As will be seen from FIG. 25, the common display format for processing of letters relating to office actions and oppositions can be utilized for preparation of various letters. After this, the case data is searched in terms of the identification of the reference numbers entered at the step 1402 or 1408, and at a step 1411, and the case data of the identified applications in the case file 30. By accessing the local case file at the step 1410, the agent to whom the letter will be sent, date to be indicated on the letter and so forth can be picked up. Similarly, by accessing the master file 10, the person in charge of the subject application, address and so forth above the identified agent and so forth are picked up.

As will be seen from FIG. 25, the reference number, e.g. "S84P100-US00" is set in a block 400 as set at the step 1402 or 1408. The date to be indicated on the letter and read from the local case file at the step 1410 is set in a block 401 of the display format. Similarly, the title of the invention, name or initial of the person in charge of the subject application, and agent's name are indicated in blocks 402, 403 and 404. The display format further includes selection blocks 405 to 409 for selecting content to be included in the letter. Furthermore, the display format of FIG. 25 further includes sub-blocks 410 to 416 to be selected when the corresponding items are selected through the blocks 405 to 409 for selecting sub-items to be included in the letter.

Selection of the items is performed at a step 1413 through the keyboard. In the example shown, the items are selected by setting "Y" in the blocks 405 and 406. By setting "Y" in the block 405, the sentence "WE ACKNOWLEDGE RECEIPT OF YOUR LETTER . . . . . . . . ENCLOSING THE FOLLOWING DOCUMENT(S)." is selected. The kind of document to be indicated subsequently to the foregoing sentence may be selected by setting "Y" in one of the sub-blocks 410, 411 and 412 for selecting "OFFICE ACTION", "THE GROUND OF OPPOSITION" or "THE REFUTATION OF OPPOSITION". Since the "Y" is set in the block 410, the office action is selected as the document to be indicated. In the letter the date to be indicated in the blank corresponding to the block 401 is picked up from the local case file. 30 as set forth above. In the example shown, since the orifice action is mailed from the agent on June 6, 1985, the corresponding data "851001" is picked up from the local case file and inserted in the block 401. Therefore, the completed sentence is to be read: "We acknowledge receipt of your letter on June 6, 1985 ("851001") enclosing the following document(s).

Office Action"

Similarly, since the "Y" is set in the block 406, the sentence "ENCLOSED ARE OUR COMMENTS ON THE ABOVE ACTION . . . . . . " The blank in the last section of the sentence can be filled by picking up date information, i.e. official mailing date, Sep. 25, 1985 from the local case file 30. Therefore, the completed sentence would become:

"Enclosed are our comments on the above action Sep. 25, 1985 ("850925")

After selecting the contents of the letter at the step 1413, CPU searches the document data file for the corresponding letter format at a step 1414. As a result of this search, the letter format of FIG. 26 may be selected. Then, the local case file is searched again at a step 1415 for variables to be contained in the letter to be prepared utilizing the letter format of FIG. 26. Similarly, at a step 1416, the case data in the case in the case file 30 is searched for variables to be contained in the case. In practice, the agent's mailing date, e.g. "851001" to be inserted in a block 420, the kind of action, i.e. "Office Action" to be inserted in a block 421, and the due date, e.g. "851225" to be inserted in a block 422 are picked up from the local case file 300, at the step 1415. On the other hand, the name of an attorney, e.g. "Mr. A" and agent's firm name, e.g. "A LAW FIRM" and firm address, e.g. "Suite 1111, 1828 L Street Northwest, Washington, D.C. 20036-5104, U.S.A." to be inserted in blocks 423, 424 and 425, application number, e.g. "06/123,456" to be inserted in a block 426, and agent's docket number, e.g. "012345" to be inserted in a block 427 are picked up from the case data in the case file 30.

After completing insertion of the variables, layout of the selected document is performed at a step 1417. The processes through the steps 1414 to 1417 are repeatedly performed until all variables are entered in the letter format of FIG. 26. After completing a layout, the printer 4 is activated to obtain a print out of the letter. During the layout process in the step 1417, all the information in a particular form, such as "850925", "851001" are converted into usual forms, i.e. Sep. 25, 1985, Oct. 1, 1985 and so forth.

As will be appreciated herefrom, the preparation of letters to be sent to the agents can be significantly simplified by allowing the choosing of necessary data from the local case file, case data in the case and so forth.

While the present invention has been disclosed in terms of the preferred embodiment in order to facilitate better a understanding of the invention, it should be appreciated that the invention can be embodied in various ways without departing from the principle of the invention. Therefore, the invention should be understood to include all possible embodiments and modifications to the shown embodiments which can be varied without departing from the principle of the invention set out in the appended claims.

What is claimed is:

1. A system for managing preparation and prosecution of applications to be filed in various countries for protection of industrial property rights, comprising:

first means including a memory for storing information concerning each application, including at least an identification of an application and an identification of at least a country in which the application is filed;

second means involving a memory for storing at least one rule for controlling processing of applications throughout preparation and prosecution of at least an application, said at least one rule being established with respect to each country in which the application is to be filed for defining an order of steps to be taken during preparation and prosecution of the application and for establishing at least a time table for due dates for taking such action with respect to the corresponding country, said one rule being accessible by identifying the country in which the application is filed;

third means for displaying necessary information and guidance for processing the application including entry of data according to the rule stored in said second means; and fourth means for allowing entry of data and commands for operating the managing system and controlling updating of contents in said first and/or second memory means.

2. A system as set forth in claim 1, wherein said first memory means further comprises a local case data file having a plurality of file pages each storing case data of each corresponding application, said case data including data indicative of history of the application and current status of the application.

3. A system as set forth in claim 2, wherein said second memory means stores said at least one rule including a rule selecting at least one next step with respect to current status of the application.

4. A system as set forth in claim 3, wherein said at least one rule in said second memory means defines a rule table set with respect to each country in which the application is filed, said rule table being accessible by identifying the country, wherein said rule table can be updated through said fourth means.

5. A system as set forth in claim 4, which further comprises fifth means including a memory for storing a plurality of display formats to be displayed on said third means, and said second means includes a rule for selecting one of said display formats according to the data entry step.

6. A system as set forth in claim 5, wherein said second memory means stores data with respect to each of a plurality of steps in each rule table, wherein each of said steps in said rule table is identified by a step number given thereto.

7. A system as set forth in claim 4, wherein said second memory means further comprises a common step table containing all of the necessary steps for preparation and prosecution of applications in all the countries in which the application is to be filed, wherein each step in the common step table is given a step number for identifying the step, and said rule table for each country is established by selecting the steps in said common step table in sequence according to normal procedure to be taken in preparing and prosecuting the application in the subject country.

8. A system as set forth in claim 7, wherein said steps in said common step table and said rule tables are accessible through said fourth means by entering step numbers given to respective steps for identification thereof.

9. A system as set forth in claim 8, wherein said step number to be given to each of the said rule table has a first component common to said step number of each corresponding step in said common step table and a second component independent of the step number of the corresponding step in said common step table for distinguishing the steps in said rule table from the corresponding step or steps in said common step table.

10. A system as set forth in claim 9, wherein said rule table in said second memory means further contains term calculation data for calculating and deriving a due date with respect to a reference date in each step, said term calculation data being accessible by an identifying step by entry of a step number through said fourth means.

11. A system as set forth in claim 9, wherein said rule table contains data indicative of an effective period of each step therein in view of the laws and/or rules in the subject country, said effective period being defined by the starting date data and ending date data of said effective period.

12. A system as set forth in claim 11, wherein said effective period set in said rule table with respect to each step in said rule table is set in terms of a reference date, and said effective period data is associated with an identification of said reference date.

13. A system as set forth in claim 12, wherein said fourth means compares an input date corresponding to said reference date with said starting date data and ending date data in response to entry of said step number for checking whether the updating of a step date for the step identified by an entered step number is valid or not, so that said step data can be updated only by the valid data.

14. A system as set forth in claim 9, which further comprises fifth means including a memory for storing a plurality of display formats to be displayed on said third means, and said second means includes a rule for selecting one of the display formats of the step at which data is to be entered.

15. A system as set forth in claim 14, wherein each of said display formats is accessible by an identifying step in said rule table by entry of said step number.

16. A system as set forth in claim 9, which further comprises sixth means including a memory for storing document printing format data which is accessible by identifying the step for preparing letters.

17. A system as set forth in claim 16, wherein said printing document data stored in said sixth memory means comprises a first component containing a plurality of fixed letter formats commonly used in various steps and for various applications in various countries, and a second component adapted to accept specific variables with respect to the subject step and the subject application.

18. A system as set forth in claim 17, wherein said second component stored in said sixth memory means is a letter format taking at least one of said specific variables as a part of the letter.

19. A system as set forth in claim 18, wherein said fourth means selects variables from the corresponding file page of said local case data file in said first means for automatically completing said letter in said second component.

20. A system as set forth in claim 19, wherein said fourth means further selects said variables to constitute part of said letter of said second component from said information stored in said first memory means.

21. A system for managing preparation and prosecution of applications to be filed in various countries for protection of industrial property rights, comprising:
   first means including a memory for storing information concerning at least an application, said first memory means comprising a database file including identification of said application, identification of at least a country in which the application is filed, and filing particulars for each respective application;
   second means including a memory for storing a rule table of steps for controlling processing of said at least one application throughout preparation and prosecution of the application and a time table for controlling calculation of the term for the application, said steps in said rule table being established with respect to each country in which to file the application for defining an order of steps to be taken during preparation and prosecution of the application, said steps in said rule table being identified by given step numbers and establishing a time table for determining due dates for taking action with respect to the corresponding country and accessible by identifying the country and step number of a corresponding step set in said rule table for processing the application;
   third means for establishing a case data file containing a plurality of file pages, each of which is adapted to store file data with respect to the subject application, said stored file data including a history data showing the history of preparation and prosecution and current status of the subject application, each file page of said case file further including data showing a due date for taking necessary action derived from and based on entered data according to said time table; and fourth means for allowing entry of data and command for operating the managing system and controlling updating of contents in said first and/or second memory means.

22. A system as set forth in claim 21, wherein said step number to be given for each the steps in said rule table has a first component common to said step number of each corresponding step in said common step table and a second component independent of the step number of the corresponding step in said common step table for distinguishing the steps in said rule table from the corresponding step in said common step table.

23. A system as set forth in claim 22, wherein said rule table contains data indicative of an effective period of each step therein in view of the laws and/or rules in the subject country, which effective period is defined by the starting date data and ending date data of said effective period.

24. A system as set forth in claim 23, wherein said effective period set in said rule table with respect to each step in said rule table is set in terms of a reference date, and said effective period data is associated with an identification of said reference date.

25. A system as set forth in claim 24, wherein said fourth means compares an input date corresponding to said reference date with said starting date data and ending date data in response to entry of said step number for checking the updating of the step date.

26. A system as set forth in claim 25, wherein said second memory stores said rule table including a rule for selecting one or more necessarily occuring next steps with respect to current status of the application.

27. A system as set forth in claim 26, which further comprises a display and fifth means including a memory for storing a plurality of display formats to be displayed on said display, and said rule table in said second means includes a rule for selecting one of said display formats according to the data entry step.

28. A system as set forth in claim 27, wherein each of said display formats is accessible by an identifying step in said rule table by entry of said step number.

29. A system as set forth in claim 27, which further comprises sixth means including a memory for storing a plurality of printer document data which is accessible by identifying the step for preparing letters.

30. A system as set forth in claim 29, wherein said printer document data stored in said sixth memory means comprises a first component containing a fixed letter format to be commonly used in various steps and for various applications in various countries, and a second component adapted to accept specific variables with respect to a subject step and a subject application.

31. A system as set forth in claim 30, wherein said second component stored in said sixth memory means is a letter format taking said at least one specific variable as a part of the letter.

32. A system as set forth in claim 31, wherein said fourth means selects variables from the corresponding file page of said local case data file in said first means for automatically completing said letter in said second component.

33. A system as set forth in claim 32, wherein said fourth means further selects said variables to constitute part of said letter of said second component from said information stored in said first memory means.

34. A system for managing preparation and prosecution of applications to be filed in various countries for protection of industrial property rights, comprising:

first means including a memory for storing information concerning each application, said first memory means comprising a database file including at least an identification of each application, at least an identification of a country to file the application, and filing particulars;

second means including a memory for storing a rule table for controlling processing of an application throughout preparation and prosecution of the application and a time table for controlling calculation of the term for the application, said rule table being established with respect to each country to file the application for defining an order of steps to be taken for action during preparation and prosecution of the application, said steps in said rule table being identified by given step numbers and establishing a time table for determining due dates for taking action with respect to the corresponding country and accessible by identifying the country and step number of a corresponding step set in said rule table in the process of application;

third means including a memory for establishing a case data file containing a plurality of file pages, each of which is adapted to stored file data with respect to a subject application, said stored file data including a history data showing the history of preparation and prosecution and current status of the subject application, each file page of said case file further including data showing a due date for taking necessary action derived based on entered data according to said time table;

fourth means including a memory for storing a plurality of display formats, each of which corresponds to one of said steps set in said rule table and is accessible by identifying the subject step by setting said step number, and each of said display formats includes guidances for requiring entry of data; a display; and fifth means for allowing entry of data and command for operating the managing system, reading out one of said display formats according to said step number for displaying a selected one of display formats on said display, and controlling updating of contents against the selected display format.

35. A system as set forth in claim 34, wherein said fourth memory means includes a first group of display formats accessible through said fifth means for updating said rule table, a second group of display formats accessible through said fifth means for updating said time table; and third group of display formats accessible through said fifth means for updating said case data file.

36. A system as set forth in claim 35, wherein said step number to be given for each of steps in said rule table has a first component common to said step number of each corresponding step in said common step table and a second component independent of the step number of the corresponding step in said common step table for distinguishing the steps in said rule table from the corresponding step in said common step table.

37. A system as set forth in claim 36, wherein said fourth memory means further includes a display format to be utilized for establishing said rule table by selecting steps in said common step table.

38. A system as set in claim 36, wherein said fourth memory means further includes a display format to be utilized for establishing said time table.

39. A system as set forth in claim 36, wherein said rule table contains data indicative of an effective period of each step therein determined by the laws and/or rules in the subject country, which effective period is defined by the starting date data and ending date data of said effective period.

40. A system as set forth in claim 39, wherein said effective period set in said rule table with respect to each step in said rule table is set in terms of a reference date, and said effective period data being associated with an identification of said reference date.

41. A system as set forth in claim 40, wherein said fifth means compares an input date corresponding to said reference data with said starting date data and ending date data in response to entry of said step number for checking whether the updating of step date.

42. A system as set forth in claim 41, wherein said second memory stores said rule table including a rule for selecting one or more necessarily occuring next steps with respect to current status of the application.

43. A system as set forth in claim 36, which further comprises sixth means including a memory for storing a plurality of printer document data which is accessible by identifying the step for preparing letters.

44. A system as set forth in claim 43, wherein said printer document data stored in said sixth memory means comprises a first component containing a fixed letter format to be commonly used in various steps and for various applications in various countries, and a second component adapted to accept specific variables with respect to a subject step and a subject application.

45. A system as set forth in claim 44, wherein said second component stored in said sixth memory means is a letter format taking at least one of said specific variables as a part of the letter.

46. A system as set forth in claim 45, wherein said fifth means selects variables from the corresponding file page of said local case data file in said first means for automatically completing said letter in said second component.

47. A system as set forth in claim 45, wherein said fifth means further selects said variables to constitute part of said letter of said second component from said information stored in said first memory means.

48. A system as set forth in claim 45, wherein said fifth means further selects said variables to constitute part of said letter of said second component from said information stored in said first memory means.

49. A system for managing preparation and prosecution of applications to be filed in various countries for protection of industrial property rights, comprising:
   first means including a memory for storing information concerning each application, said first memory means comprising a database file including an identification of each application, an identification of country to file the application, and filing particulars;
   second means including a memory for storing a rule table for controlling processing of said at least one application throughout preparation and prosecution of the application and a time table for controlling calculation of term, said at least one rule being established with respect to each country to file the application for defining an order of steps to be taken for action during preparation and prosecution of the application, said steps in said rule table being identified by given step numbers and for establishing a time table for determining due dates for taking action with respect to the corresponding country and accessible by identifying the country and step number of a corresponding step set in said rule table in the processing of the application;
   third means including a memory for establishing a case data file containing a plurality of file pages, each of which is adapted to store file data with respect to a subject application, said stored file data including a history data showing the history of the preparation and prosecution and current status of the subject application, each file page of said case file further including data showing due date for taking necessary action derived based on entered data according to said time table;
   fourth means including a memory for storing a plurality of printer document formats, each of which corresponds to one of said steps set in said rule table and is accessible by identifying the subject step by setting said step number;
   a printer; and
   fifth means for allowing entry of data and command for operating the managing system, reading out one of said printer document formats according to a set step number for displaying a selected one of printer document formats for preparing a letter, and controlling updating of contents in said first, second, third and fourth memory means.

50. A system as set forth in claim 49, which further comprises sixth means including a memory for storing a plurality of display formats, each of which corresponds to one of said steps set in said rule table and is accessible by identifying the subject step by setting said step number, and each of said display format including guidances for requiring entry of data, and a display.

51. A system as set forth in claim 50, wherein said display formats stored in said sixth means includes printer document display formats, each corresponding to one of said printer documents formats stored in said fourth means.

52. A system as set forth in claim 51, wherein said sixth memory means further includes a first group of display formats accessible through said fifth means for updating said rule table, a second group of display formats accessible through said fifth means for updating said time table; and a third group of display formats accessible through said fifth means for updating said case data file.

53. A system as set forth in claim 52, wherein said step number to be given for each of steps in said rule table has a first component common to said step number of each corresponding step in said common step table and a second component independent of the step number of the corresponding step in said common step table for distinguishing the steps in said rule table from the corresponding step in said common step table.

54. A system as set forth in claim 53, wherein said fourth memory means further includes a display format to be utilized for establishing said rule table by selecting steps in said common step table.

55. A system as set forth in claim 54, wherein said sixth memory means further includes a display format to be utilized for establishing said time table.

56. A system as set forth in claim 55, wherein said rule table contains data indicative of an effective period of each step therein determined according to the laws and/or rules in a select country, which effective period is defined by the starting date data and the ending date data of said effective period.

57. A system as set forth in claim 56, wherein said effective period set in said rule table with respect to each step in said rule table in set in terms of a reference date, and said effective period data being associated with an identification of said reference date.

58. A system as set forth in claim 57, wherein said fifth means compares an input date corresponding to said reference date with said starting date data and ending date data in response to entry of said step number for checking the updating of the step date.

59. A system as set forth in claim 58, wherein said second memory stores said rule table including a rule for selecting one or more necessarily occuring next steps with respect to current status of the application.

60. A system as set forth in claim 59, which further comprises seventh means including a memory for storing a plurality of printer document data which is accessible by identifying the step for preparing letters.

61. A system as set forth in claim 49, wherein said printer document formats stored in said fourth memory means comprises a first component containing a fixed letter format to be commonly used in various steps and for various applications in various countries, and a second component adapted to accept specific variables with respect to subject step and subject application.

62. A system as set forth in claim 61, wherein said second component stored in said sixth memory means is a letter format taking at least one of said specific variables as a part of the letter.

63. A system as set forth in claim 62, wherein said fifth means selects variables from the corresponding file page of said local case data file in said first means for automatically completing said letter in said second component.

64. A system for managing preparation and prosecution of applications for protection of industrial property rights, comprising:
   first memory means for storing information concerning each application, including identification of the corresponding application to be managed;
   second memory means for storing at least a rule for controlling processing of at least corresponding one of the applications throughout preparation and prosecution of the application, said rule defining an order of steps to be taken during preparation and prosecution of the application and establishing a time table for due dates for taking action in the application, said rule including identification of at least a next step to be taken;
   third means for displaying necessary information and guidance for processing the application including entry of data according to the rule stored in said second means; and
   fourth means for allowing entry of data and commands for operating the managing system and controlling updating of contents in said first and/or second memory means.

65. A system as set forth in claim 64, wherein said first memory means further comprises a local case data file having a plurality of file pages each storing case data of each corresponding application, said case data including data indicative of a history of the application and a current status of the application.

66. A system as set forth in claim 65, wherein said second memory stores said rule including a rule for selecting at least one next step with respect to current status of the application.

67. A system as set forth in claim 66, which further comprises fifth means including a memory for storing a plurality of display formats to be displayed on said third means, and said second means storing said rule includes a rule for selecting one of said display formats according to the data entry step;

68. A system as set forth in claim 67, wherein said second memory means stores data with respect to each of a plurality of steps in each rule table, wherein each of the steps in said rule table are identified by a step number given thereto.

69. A system as set forth in claim 68, wherein said rule table in said second memory means further contains term calculation data for calculating and deriving a due date with respect to a reference date in each step, said term calculation data being accessible by an identifying step by entry of a step number through said fourth means.

70. A system as set forth in claim 69, wherein said rule table contains data indicative of an effective period of each step therein in view of the laws and/or rules, said effective period being defined by the starting date data and ending date data of said effective period.

71. A system as set forth in claim 70, wherein said effective period set in said rule table with respect to each step in said rule table is set in terms of a reference date, and said effective period data being associated with an identification of said reference date.

72. A system as set forth in claim 64, which further comprises fifth means including a memory for storing a plurality of display formats to be displayed on said third means, and said second means storing said rule including a rule for selecting one of the display format of the step at which data is to be entered.

73. A system as set forth in claim 72, wherein each of said display formats is accessible by an identifying step in said rule table by entry of said step number.

74. A system as set forth in claim 73, which further comprises sixth means including a memory for storing document printing format data which is accessible by identifying the step for preparing letters.

75. A system as set forth in claim 74, wherein said printer document data stored in said sixth memory means comprises a first component containing a plurality of fixed letter formats commonly used in various steps and for various applications in various countries, and a second component adapted to accept specific variables with respect to a subject step and a subject application.

76. A system as set forth in claim 75, wherein said second component stored in said sixth memory means is a letter format taking said specific variable as a part of the letter.

* * * * *